United States Patent
Hsueh et al.

(10) Patent No.: US 8,896,937 B1
(45) Date of Patent: Nov. 25, 2014

(54) IMAGE CAPTURING LENS ASSEMBLY AND IMAGE CAPTURING DEVICE

(71) Applicant: Largan Precision Co., Ltd., Taichung (TW)

(72) Inventors: Chun-Che Hsueh, Taichung (TW); Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 14/018,412

(22) Filed: Sep. 4, 2013

(30) Foreign Application Priority Data

Aug. 5, 2013 (TW) .............................. 102127980 A

(51) Int. Cl.
  *G02B 13/18* (2006.01)
  *G02B 9/34* (2006.01)
  *G02B 3/04* (2006.01)
(52) U.S. Cl.
  CPC ........................................ *G02B 3/04* (2013.01)
  USPC ........... 359/715; 359/771; 359/772; 359/773; 359/774
(58) Field of Classification Search
  USPC .......................... 359/715, 771, 772, 773, 774
  See application file for complete search history.

(56) References Cited

U.S. PATENT DOCUMENTS

| | | | | |
|---|---|---|---|---|
| 7,549,809 B2* | 6/2009 | Isono | ............................. | 396/439 |
| 8,068,290 B1* | 11/2011 | Tsai et al. | ..................... | 359/773 |
| 8,503,108 B2* | 8/2013 | Huang | ........................... | 359/715 |
| 2012/0099014 A1* | 4/2012 | Huang et al. | .................. | 348/340 |
| 2013/0188264 A1* | 7/2013 | Hashimoto | .................... | 359/715 |

* cited by examiner

*Primary Examiner* — Scott J Sugarman
(74) *Attorney, Agent, or Firm* — CKC & Partners Co., Ltd.

(57) ABSTRACT

An image capturing lens assembly includes, in order from an object side to an image side, a first lens element, a second lens element, a third lens element and a fourth lens element. The first lens element with positive refractive power has a convex object-side surface in a paraxial region thereof and a convex image-side surface in a paraxial region thereof. The second lens element with negative refractive power has a concave object-side surface in a paraxial region thereof and a convex image-side surface in a paraxial region thereof. The third lens element with positive refractive power has a concave object-side surface in a paraxial region thereof and a convex image-side surface in a paraxial region thereof. The fourth lens element with refractive power has a concave image-side surface in a paraxial region thereof. The image capturing lens assembly has a total of four lens elements with refractive power.

21 Claims, 20 Drawing Sheets

US 8,896,937 B1

IMAGE CAPTURING LENS ASSEMBLY AND IMAGE CAPTURING DEVICE

RELATED APPLICATIONS

This application claims priority to Taiwan Application Serial Number 102127980, filed Aug. 5, 2013, which is incorporated by reference herein in its entirety.

BACKGROUND

1. Technical Field

The present disclosure relates to an image capturing lens assembly. More particularly, the present disclosure relates to a compact image capturing lens assembly applicable to portable electronic products.

2. Description of Related Art

In recent years, with the popularity of mobile products having camera functionalities, the demand for miniaturized optical systems has been increasing. The sensor of a conventional photographing camera is typically a CCD (Charge-Coupled Device) image sensor or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional compact optical system employed in a portable electronic product mainly adopts a three-element lens structure. Due to the popularity of mobile products with high-end specifications, such as smart phones and tablet personal computers, the pixel and image-quality requirements of the compact optical systems have increased rapidly. However, the conventional three-piece lens structure cannot satisfy the requirements of the compact optical systems.

On the other hand, the conventional optical system utilizes four-element lens structure for enhancing the image quality and resolution of the optical system, but the surface shape and axial distance are not favorable for both obtaining a wide viewing angle and keeping a compact size. Accordingly, this conventional compact optical system is not applicable to a portable and compact electronic product.

SUMMARY

According to one aspect of the present disclosure, an image capturing lens assembly includes, in order from an object side to an image side, a first lens element, a second lens element, a third lens element and a fourth lens element. The first lens element with positive refractive power has a convex object-side surface in a paraxial region thereof and a convex image-side surface in a paraxial region thereof. The second lens element with negative refractive power has a concave object-side surface in a paraxial region thereof and a convex image-side surface in a paraxial region thereof. The third lens element with positive refractive power has a concave object-side surface in a paraxial region thereof and a convex image-side surface in a paraxial region thereof. The fourth lens element with refractive power has a concave image-side surface in a paraxial region thereof, wherein an object-side surface and the image-side surface of the fourth lens element are aspheric, and the image-side surface of the fourth lens element has at least one convex shape in an off-axis region thereof. The image capturing lens assembly has a total of four lens elements with refractive power. When a curvature radius of the image-side surface of the first lens element is R2, a curvature radius of the object-side surface of the second lens element is R3, an axial distance between the first lens element and the second lens element is T12, an axial distance between the second lens element and the third lens element is T23, and an axial distance between the third lens element and the fourth lens element is T34, the following conditions are satisfied:

$1.9 < R2/R3$; and $2.1 < T12/(T23+T34) < 3.3$.

According to another aspect of the present disclosure, an image capturing device includes the image capturing lens assembly according to the aforementioned aspect and an image sensor, wherein the image sensor is disposed on an image plane of the aforementioned image capturing lens assembly.

According to still another aspect of the present disclosure, an image capturing lens assembly includes, in order from an object side to an image side, a first lens element, a second lens element, a third lens element and a fourth lens element. The first lens element with positive refractive power has a convex object-side surface in a paraxial region thereof and a convex image-side surface in a paraxial region thereof. The second lens element with negative refractive power has a concave object-side surface in a paraxial region thereof and a convex image-side surface in a paraxial region thereof. The third lens element with positive refractive power has a concave object-side surface in a paraxial region thereof and a convex image-side surface in a paraxial region thereof. The fourth lens element with refractive power has a convex object-side surface in a paraxial region thereof and a concave image-side surface in a paraxial region thereof, wherein the object-side surface and the image-side surface of the fourth lens element are aspheric, and the image-side surface of the fourth lens element has at least one convex shape in an off-axis region thereof. The image capturing lens assembly has a total of four lens elements with refractive power. When a curvature radius of the image-side surface of the first lens element is R2, a curvature radius of the object-side surface of the second lens element is R3, an axial distance between the first lens element and the second lens element is T12, an axial distance between the second lens element and the third lens element is T23, an axial distance between the third lens element and the fourth lens element is T34, a focal length of the second lens element is f2, and a focal length of the third lens element is f3, the following conditions are satisfied:

$1.8 < R2/R3$;

$1.9 < T12/(T23+T34) < 3.3$; and $f2/f3 < -0.80$.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
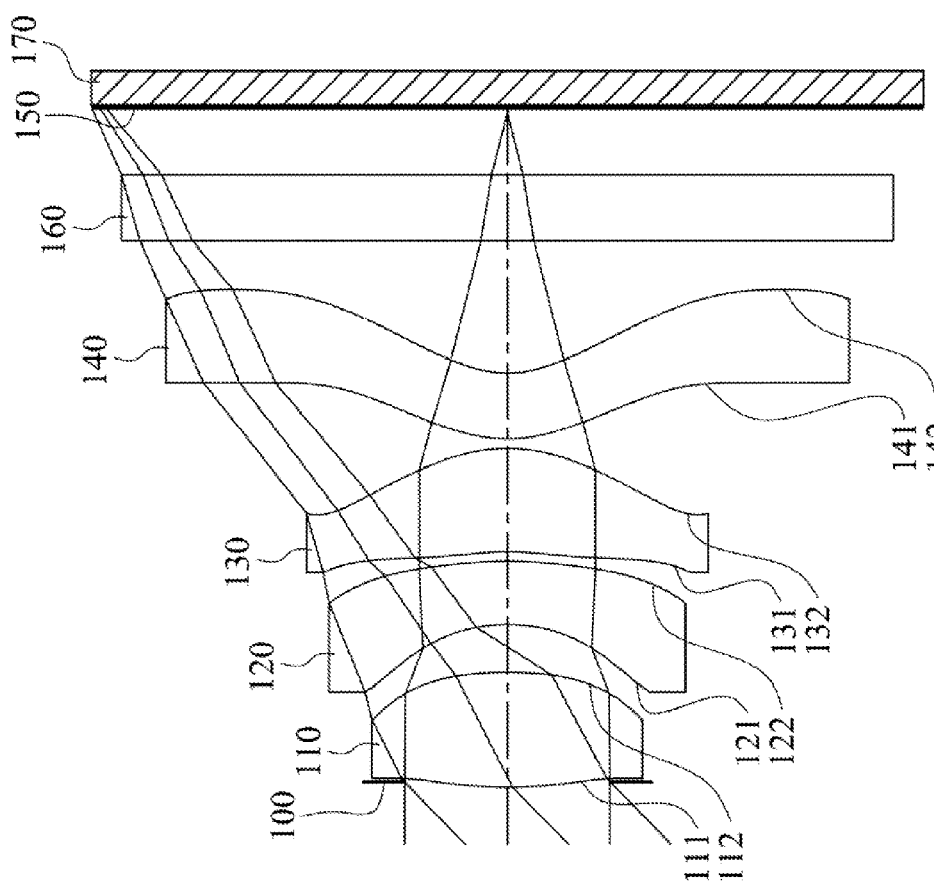
FIG. 1 is a schematic view of an image capturing lens assembly according to the 1st embodiment of the present disclosure.

An image capturing lens assembly includes, in order from an object side to an image side, a first lens element, a second lens element, a third lens element and a fourth lens element. The image capturing lens assembly has a total of four lens elements with refractive power.

The first lens element with positive refractive power has a convex object-side surface in a paraxial region thereof and a convex image-side surface in a paraxial region thereof. Therefore, it is favorable for reducing the total track length of the image capturing lens assembly by properly adjusting the positive refractive power of the first lens element.

The second lens element has negative refractive power, so that it is favorable for correcting the aberration generated by the first lens element. The second lens element has a concave object-side surface in a paraxial region thereof and a convex image-side surface in a paraxial region thereof, so that it is favorable for obtaining a larger field of view so as to be applied to a portable and compact image capturing lens assembly.

The third lens element with positive refractive power has a concave object-side surface in a paraxial region thereof and a convex image-side surface in a paraxial region thereof, so that it is favorable for avoiding excessive spherical aberration and correcting astigmatism.

The fourth lens element can have negative refractive power and a convex object-side surface in a paraxial region thereof, and has a concave image-side surface in a paraxial region thereof, wherein the image-side surface of the fourth lens element has at least one convex shape in an off-axis region thereof. Therefore, it is favorable for the principal point of the image capturing lens assembly being positioned away from an image plane so as to reduce the back focal length and correct the aberration of the off-axis effectively.

When a curvature radius of the image-side surface of the first lens element is R2, and a curvature radius of the object-side surface of the second lens element is R3, the following condition is satisfied: 1.8<R2/R3. Therefore, it is favorable for reducing the manufacturing sensitivity of the image capturing lens assembly so as to further increase the manufacturing yield rate. Preferably, the following condition is satisfied: 1.9<R2/R3.

When an axial distance between the first lens element and the second lens element is T12, an axial distance between the second lens element and the third lens element is T23, and an axial distance between the third lens element and the fourth lens element is T34, the following condition is satisfied: 1.9<T12/(T23+T34)<3.3. Therefore, it is favorable for keeping a compact size of the image capturing lens assembly. Preferably, the following condition is satisfied: 2.1<T12/(T23+T34)<3.3.

When a focal length of the second lens element is f2, and a focal length of the third lens element is f3, the following condition is satisfied: f2/f3<−0.72. Therefore, it is favorable for correcting the aberration and spherical aberration. Preferably, the following condition is satisfied: f2/f3<−0.80. More preferably, the following condition is satisfied: −3.0<f2/f3<−1.0.

When a maximal field of view of the image capturing lens assembly is FOV, the following condition is satisfied: 80 degrees<FOV<105 degrees. Therefore, it is favorable for having a larger field of view so as to obtain more of the image scene.

When a central thickness of the fourth lens element is CT4, a distance in parallel with an optical axis from an axial vertex on the object-side surface of the fourth lens element to a maximum effective radius position on the object-side surface of the fourth lens element is Sag100, a distance in parallel with the optical axis from the axial vertex on the object-side surface of the fourth lens element to 80% of the maximum effective radius position on the object-side surface of the fourth lens element is Sag80, and a distance in parallel with the optical axis from the axial vertex on the object-side surface of the fourth lens element to 60% of the maximum effective radius position on the object-side surface of the fourth lens element is Sag60, the following condition is satisfied: (|Sag100−Sag80|+|Sag80−Sag60|)/CT4<0.20. Therefore, the surface shape of the lens element will not be excessively curved, so that it is favorable for manufacturing and molding the lens element so as to keep the image capturing lens assembly more compact.

When the curvature radius of the object-side surface of the second lens element is R3, and a curvature radius of the image-side surface of the second lens element is R4, the following condition is satisfied: 1.4<R4/R3<3.0. Therefore, it is favorable for obtaining a larger field of view of the image capturing lens assembly, so that the image capturing lens assembly is favorably applied to the portable and compact image capturing device.

When a focal length of the image capturing lens assembly is f, and a focal length of the fourth lens element is f4, the following condition is satisfied: −0.50<f/f4<0.50. Therefore, it is favorable for reducing the back focal length of the image capturing lens assembly so as to keep a compact size thereof. Preferably, the following condition is satisfied: −0.5<f/f4<0.

When an axial distance between the object-side surface of the first lens element and the image plane is TL, and half of the maximal field of view of the image capturing lens assembly is HFOV, the following condition is satisfied: 1.5 mm<TL/Tan (HFOV)<2.5 mm. Therefore, it is favorable for reducing the total track length so as to keep a compact size of the image capturing lens assembly.

When a vertical distance between a maximum effective radius position on the image-side surface of the third lens element and the optical axis is SD32, and a vertical distance between a maximum effective radius position on the object-side surface of the fourth lens element and the optical axis is SD41, the following condition is satisfied: 1.35<SD41/SD32<1.80. Therefore, it is favorable for reducing the incident angle of the light projecting onto the image sensor so as to increase the responding efficiency of the image sensor.

When a curvature radius of the object-side surface of the first lens element is R1, and a curvature radius of the image-side surface of the first lens element is R2, the following condition is satisfied: −0.6<(R1+R2)(R1−R2)<0.6. Therefore, it is favorable for reducing the total track length of the image capturing lens assembly by properly adjusting the positive refractive power of the first lens element.

According to the image capturing lens assembly of the present disclosure, the lens elements can be made of plastic or glass material. When the lens elements are made of glass material, the distribution of the refractive power of the image capturing lens assembly can be more flexible to design. When the lens elements are made of plastic material, the manufacturing cost thereof can be reduced. Furthermore, surfaces of each lens element can be arranged to be aspheric, because the aspheric surface of the lens element is easy to form a shape other than spherical surface so as to have more controllable variables for eliminating the aberration thereof, and to further decrease the required number of the lens elements. Thus, the total track length of the image capturing lens assembly can be effectively reduced.

According to the image capturing lens assembly of the present disclosure, the image capturing lens assembly can include at least one stop, such as an aperture stop, a glare stop or a field stop. Said glare stop or said field stop is for eliminating the stray light and thereby improving the image resolution thereof.

According to the image capturing lens assembly of the present disclosure, the aperture stop can be configured as a front stop or a middle stop. A front stop disposed between an imaged object and the first lens element can provide a longer distance between an exit pupil of the system and the image plane, which improves the image-sensing efficiency of the image sensor. A middle stop disposed between the first lens element and the image plane is favorable for enlarging the field of view of the system and thereby provides a wider field of view for the same.

According to the image capturing lens assembly of the present disclosure, when the lens element has a convex surface, it indicates that the surface is convex in the paraxial region thereof; when the lens element has a concave surface, it indicates that the surface is concave in the paraxial region thereof. Particularly, the paraxial region thereof refers to the region of the surface where light rays travel close to an optical axis and an off-axis region thereof refers to the region of the surface where light rays travel away from the optical axis.

According to the image capturing lens assembly of the present disclosure, the image capturing lens assembly is featured with good correction ability and high image quality, and can be applied to 3D (three-dimensional) image capturing applications, in products such as digital cameras, mobile devices, digital tablets, and other portable electronic image systems.

According to the present disclosure, an image capturing device is provided. The image capturing device includes the image capturing lens assembly according to the aforementioned image capturing lens assembly of the present disclosure, and an image sensor disposed on the image plane of the aforementioned image capturing lens assembly. Therefore, it is favorable for both obtaining a larger field of view and keeping a compact size thereof.

According to the above description of the present disclosure, the following 1st-9th specific embodiments are provided for further explanation.

1st Embodiment

Figure 2:
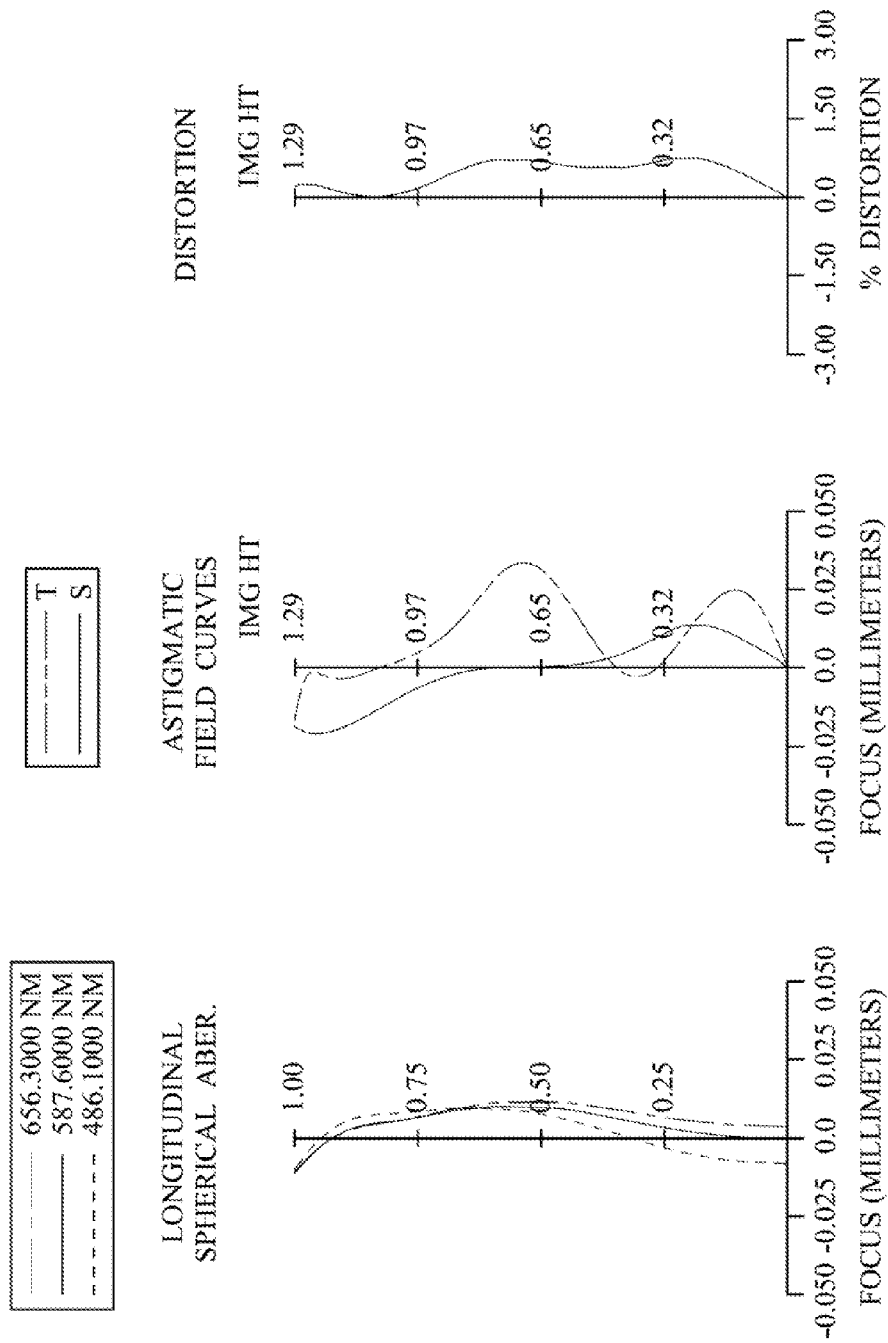
FIG. 2 shows spherical aberration curves, astigmatic field curves and a distortion curve of the image capturing lens assembly according to the 1st embodiment.

FIG. 1 is a schematic view of an image capturing lens assembly according to the 1st embodiment of the present disclosure. FIG. 2 shows spherical aberration curves, astigmatic field curves and a distortion curve of the image capturing lens assembly according to the 1st embodiment. In FIG. 1, the image capturing lens assembly includes, in order from an object side to an image side, an aperture stop 100, a first lens element 110, a second lens element 120, a third lens element 130, a fourth lens element 140, an IR-cut filter 160, an image plane 150 and an image sensor 170, wherein the image capturing lens assembly has a total of four lens elements (110-140) with refractive power.

The first lens element 110 with positive refractive power has a convex object-side surface 111 in a paraxial region thereof and a convex image-side surface 112 in a paraxial region thereof, and is made of plastic material. The object-side surface 111 and the image-side surface 112 of the first lens element 110 are aspheric.

The second lens element 120 with negative refractive power has a concave object-side surface 121 in a paraxial region thereof and a convex image-side surface 122 in a paraxial region thereof, and is made of plastic material. The object-side surface 121 and the image-side surface 122 of the second lens element 120 are aspheric.

The third lens element 130 with positive refractive power has a concave object-side surface 131 in a paraxial region thereof and a convex image-side surface 132 in a paraxial region thereof, and is made of plastic material. The object-side surface 131 and the image-side surface 132 of the third lens element 130 are aspheric.

The fourth lens element 140 with negative refractive power has a convex object-side surface 141 in a paraxial region thereof and a concave image-side surface 142 in a paraxial region thereof, and is made of plastic material. The object-side surface 141 and the image-side surface 142 of the fourth lens element 140 are aspheric. Furthermore, the image-side surface 142 of the fourth lens element 140 has at least one convex shape in an off-axis region thereof.

The IR-cut filter 160 is made of glass and located between the fourth lens element 140 and the image plane 150, and will not affect the focal length of the image capturing lens assembly.

The equation of the aspheric surface profiles of the aforementioned lens elements of the 1st embodiment is expressed as follows:

$$X(Y)=(Y^2/R)/(1+\text{sqrt}(1-(1+k)\times(Y/R)^2))+\Sigma(Ai)\times(Y^2),$$

where,

X is the relative distance between a point on the aspheric surface spaced at a distance Y from an optical axis and the tangential plane at the aspheric surface vertex on the optical axis;

Y is the distance from the point on the curve of the aspheric surface to the optical axis;

R is the curvature radius of the lens elements;

k is the conic coefficient; and

Ai is the i-th aspheric coefficient.

In the image capturing lens assembly according to the 1st embodiment, when a focal length of the image capturing lens assembly is f, an f-number of the image capturing lens assembly is Fno, and half of a maximal field of view of the image capturing lens assembly is HFOV, these parameters have the following values: f=1.34 mm; Fno=2.05; and HFOV=44.0 degrees.

In the image capturing lens assembly according to the 1st embodiment, when an axial distance between the first lens element 110 and the second lens element 120 is T12, an axial distance between the second lens element 120 and the third lens element 130 is T23, and an axial distance between the third lens element 130 and the fourth lens element 140 is T34, the following condition is satisfied: T12/(T23+T34)=2.55.

In the image capturing lens assembly according to the 1st embodiment, when a curvature radius of the image-side surface 112 of the first lens element 110 is R2, a curvature radius of the object-side surface 121 of the second lens element 120 is R3, and a curvature radius of the image-side surface 122 of the second lens element 120 is R4, the following conditions are satisfied: R2/R3=2.18; and R4/R3=1.89.

In the image capturing lens assembly according to the 1st embodiment, when a focal length of the second lens element 120 is f2, and a focal length of the third lens element 130 is f3, the following condition is satisfied: f2/f3=−1.13.

In the image capturing lens assembly according to the 1st embodiment, when the focal length of the image capturing lens assembly is f, and a focal length of the fourth lens element 140 is f4, the following condition is satisfied: f/f4=−0.16.

In the image capturing lens assembly according to the 1st embodiment, when a curvature radius of the object-side surface 111 of the first lens element 110 is R1, and the curvature radius of the image-side surface 112 of the first lens element 110 is R2, the following condition is satisfied: (R1+R2)/(R1−R2)=0.05.

In the image capturing lens assembly according to the 1st embodiment, when a vertical distance between a maximum effective radius position on the image-side surface 132 of the third lens element 130 and the optical axis is SD32, a vertical distance between a maximum effective radius position on the object-side surface 141 of the fourth lens element 140 and the optical axis is SD41, the following condition is satisfied: SD41/SD32=1.51.

In the image capturing lens assembly according to the 1st embodiment, when the maximal field of view of the image capturing lens assembly is FOV, the following condition is satisfied: FOV=88.0 degrees.

Figure 19B:
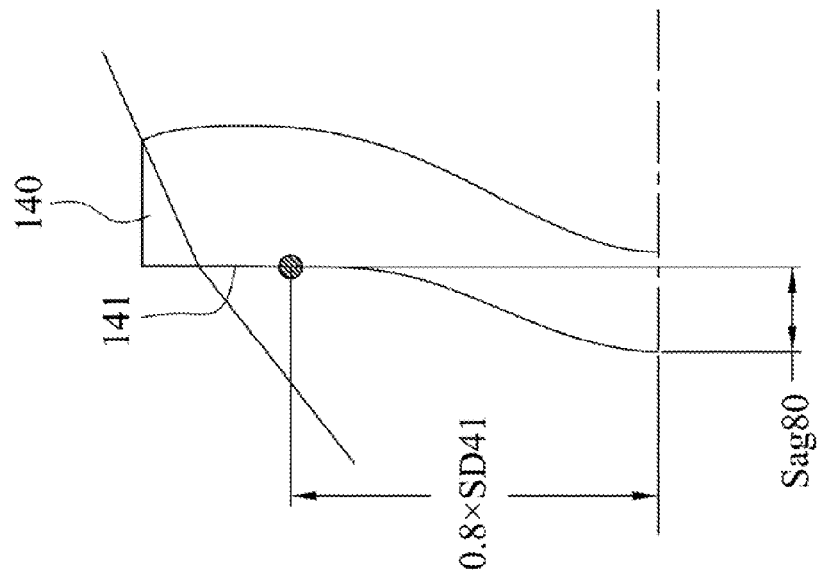
FIG. 19B shows Sag80 of the fourth lens element according to the image capturing lens assembly of the 1st embodiment of the present disclosure.
Figure 19A:
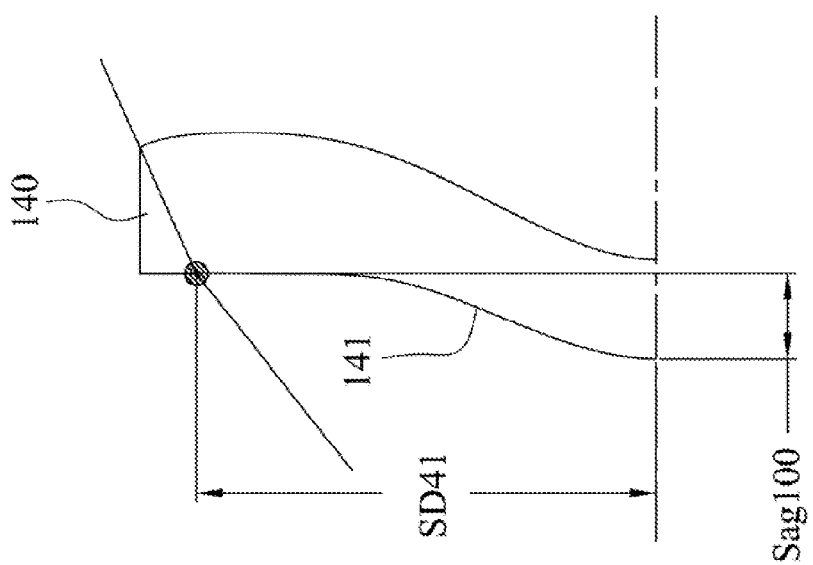
FIG. 19A shows SD41 and Sag100 of the fourth lens element according to the image capturing lens assembly of the 1st embodiment of the present disclosure.
Figure 19C:
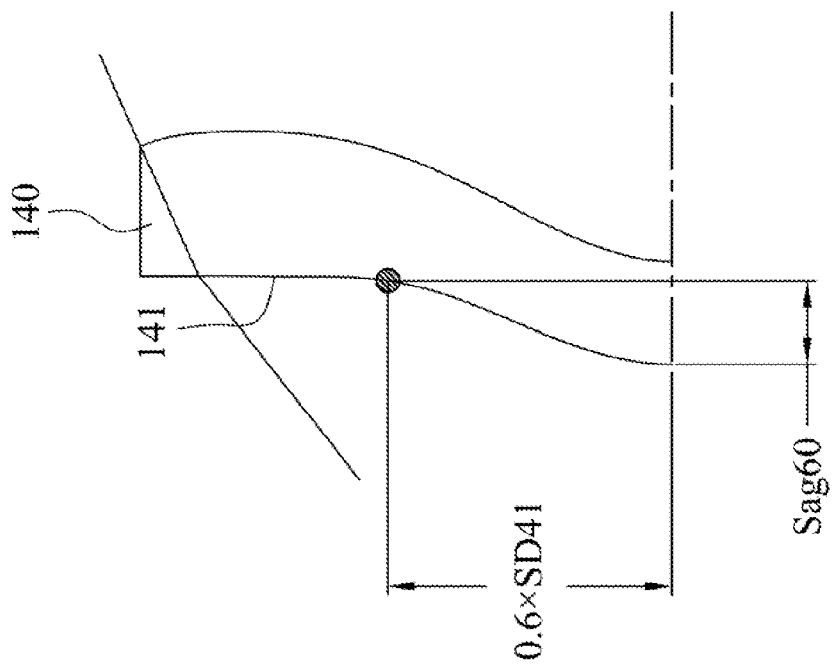
FIG. 19C shows Sag60 of the fourth lens element according to the image capturing lens assembly of the 1st embodiment of the present disclosure.

In the image capturing lens assembly according to the 1st embodiment, when an axial distance between the object-side surface 111 of the first lens element 110 and the image plane 150 is TL, and half of the maximal field of view of the image capturing lens assembly is HFOV, the following condition is satisfied: TL/Tan(HFOV)=2.24 mm. FIG. 19A shows SD41 and Sag100 of the fourth lens element 140 of the image capturing lens assembly according to the 1st embodiment, FIG. 19B shows Sag80 of the fourth lens element 140 of the image capturing lens assembly according to the 1st embodiment, and FIG. 19C shows Sag60 of the fourth lens element 140 of the image capturing lens assembly according to the 1st embodiment. In FIGS. 19A-19C, when the vertical distance between the maximum effective radius position on the object-side surface 141 of the fourth lens element 140 and the optical axis is SD41, a distance in parallel with the optical axis from an axial vertex on the object-side surface 141 of the fourth lens element 140 to the maximum effective radius position on the object-side surface 141 of the fourth lens element 140 is Sag100, a distance in parallel with the optical axis from the axial vertex on the object-side surface 141 of the fourth lens element 140 to 80% of the maximum effective radius position on the object-side surface 141 of the fourth lens element 140 is Sag80, a distance in parallel with the optical axis from the axial vertex on the object-side surface 141 of the fourth lens element 140 to 60% of the maximum effective radius position on the object-side surface 141 of the fourth lens element 140 is Sag60, and a central thickness of the fourth lens element 140 is CT4, the following condition is satisfied: (|Sag100−Sag80|+|Sag80−Sag60|)/CT4=0.05.

The detailed optical data of the 1st embodiment are shown in Table 1 and the aspheric surface data are shown in Table 2 below.

TABLE 1

1st Embodiment
f = 1.34 mm, Fno = 2.05, HFOV = 44.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.017 | | | | |
| 2 | Lens 1 | 1.377 | ASP | 0.363 | Plastic | 1.544 | 55.9 | 1.26 |
| 3 | | −1.238 | ASP | 0.153 | | | | |
| 4 | Lens 2 | −0.567 | ASP | 0.200 | Plastic | 1.634 | 23.8 | −2.24 |
| 5 | | −1.073 | ASP | 0.030 | | | | |
| 6 | Lens 3 | −0.755 | ASP | 0.328 | Plastic | 1.544 | 55.9 | 1.98 |
| 7 | | −0.512 | ASP | 0.030 | | | | |
| 8 | Lens 4 | 0.446 | ASP | 0.210 | Plastic | 1.544 | 55.9 | −8.27 |
| 9 | | 0.339 | ASP | 0.420 | | | | |
| 10 | IR-cut filter | Plano | | 0.210 | Glass | 1.517 | 64.2 | — |

TABLE 1-continued

1st Embodiment
f = 1.34 mm, Fno = 2.05, HFOV = 44.0 deg.

| Surface # | | Curvature Radius | Thickness | Material | Index | Abbe # | Focal Length |
|---|---|---|---|---|---|---|---|
| 11 | | Plano | 0.215 | | | | |
| 12 | Image | Plano | — | | | | |

Note:
Reference wavelength is 587.6 nm (d-line).

TABLE 2

Aspheric Coefficients

| Surface # | 2 | 3 | 4 | 5 |
|---|---|---|---|---|
| k = | −4.7819E+00 | −3.9020E+00 | −1.3997E+01 | −3.5326E+01 |
| A4 = | −4.3032E−01 | −2.4100E+00 | −1.0547E+01 | 1.9148E+00 |
| A6 = | 5.6941E−02 | 4.2985E+00 | 7.3366E+01 | −4.0357E+01 |
| A8 = | −3.1392E+01 | −4.7311E+01 | −2.2200E+02 | 3.2083E+02 |
| A10 = | −7.1821E+01 | 1.2246E+02 | −7.6066E+02 | −1.3667E+03 |
| A12 = | | | 8.3322E+03 | 2.9114E+03 |
| A14 = | | | −1.7507E+04 | −2.4459E+03 |

| Surface # | 6 | 7 | 8 | 9 |
|---|---|---|---|---|
| k = | −1.9566E−02 | −5.3272E+00 | −4.6648E+00 | −3.6411E+00 |
| A4 = | 1.0858E+01 | −2.6065E+00 | 4.3932E−01 | 3.2056E−01 |
| A6 = | −1.0648E+02 | 2.5557E+01 | −3.8336E+00 | 3.6629E+00 |
| A8 = | 6.8730E+02 | −1.4790E+02 | 4.7067E+00 | 9.2614E+00 |
| A10 = | −2.8847E+03 | 4.8820E+02 | 3.2743E+00 | −1.3127E+01 |
| A12 = | 7.5565E+03 | −8.4611E+02 | −1.0904E+01 | 1.1282E+01 |
| A14 = | −1.1301E+04 | 7.3175E+02 | 8.0711E+00 | −5.3985E+00 |
| A16 = | 7.3980E+03 | −2.4851E+02 | −1.9886E+00 | 1.0824E+00 |

In Table 1, the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
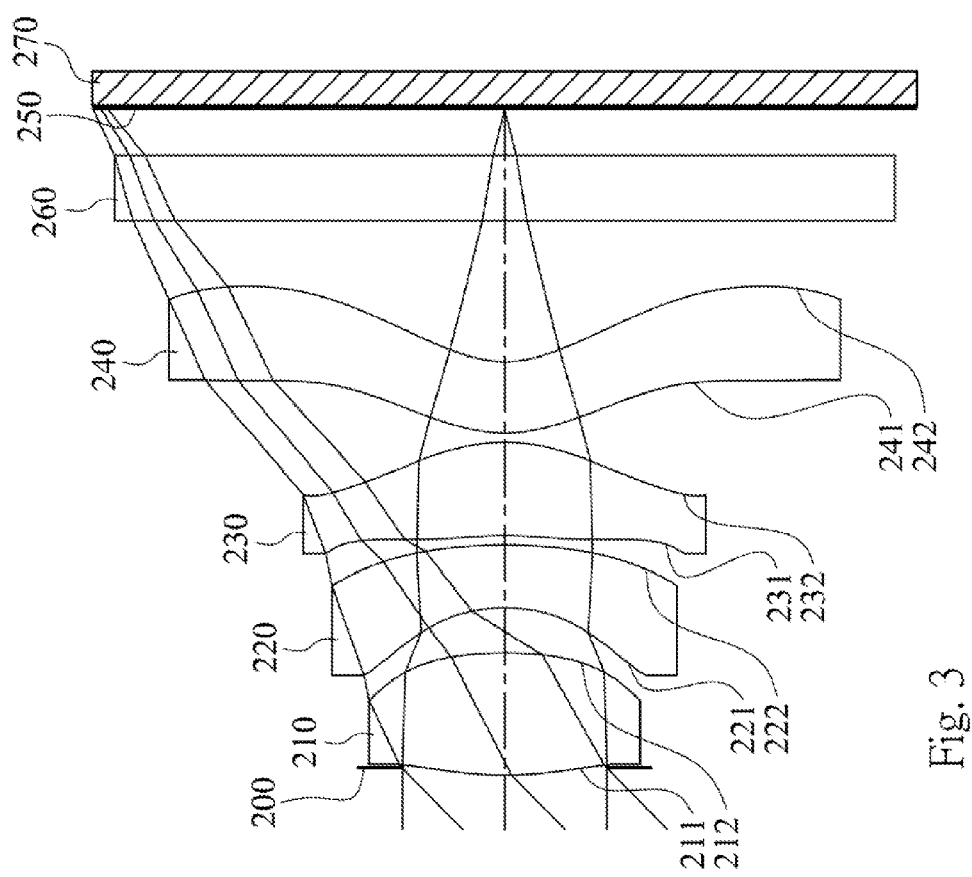
FIG. 3 is a schematic view of an image capturing lens assembly according to the 2nd embodiment of the present disclosure.
Figure 4:
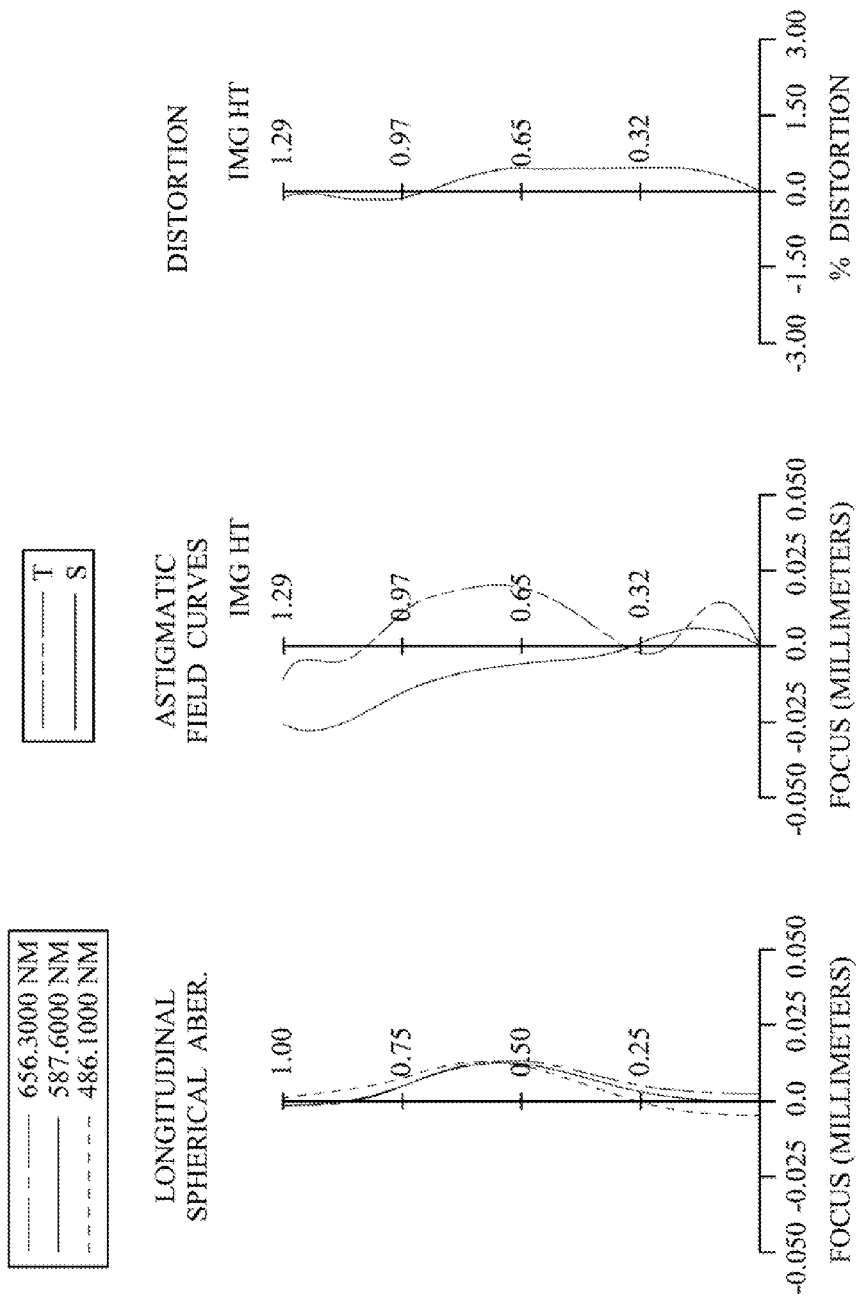
FIG. 4 shows spherical aberration curves, astigmatic field curves and a distortion curve of the image capturing lens assembly according to the 2nd embodiment.

FIG. 3 is a schematic view of an image capturing lens assembly according to the 2nd embodiment of the present disclosure. FIG. 4 shows spherical aberration curves, astigmatic field curves and a distortion curve of the image capturing lens assembly according to the 2nd embodiment. In FIG. 3, the image capturing lens assembly includes, in order from an object side to an image side, an aperture stop 200, a first lens element 210, a second lens element 220, a third lens element 230, a fourth lens element 240, an IR-cut filter 260, an image plane 250 and an image sensor 270, wherein the image capturing lens assembly has a total of four lens elements (210-240) with refractive power.

The first lens element 210 with positive refractive power has a convex object-side surface 211 in a paraxial region thereof and a convex image-side surface 212 in a paraxial region thereof, and is made of plastic material. The object-side surface 211 and the image-side surface 212 of the first lens element 210 are aspheric.

The second lens element 220 with negative refractive power has a concave object-side surface 221 in a paraxial region thereof and a convex image-side surface 222 in a paraxial region thereof, and is made of plastic material. The object-side surface 221 and the image-side surface 222 of the second lens element 220 are aspheric.

The third lens element 230 with positive refractive power has a concave object-side surface 231 in a paraxial region thereof and a convex image-side surface 232 in a paraxial region thereof, and is made of plastic material. The object-side surface 231 and the image-side surface 232 of the third lens element 230 are aspheric.

The fourth lens element 240 with positive refractive power has a convex object-side surface 241 in a paraxial region thereof and a concave image-side surface 242 in a paraxial region thereof, and is made of plastic material. The object-side surface 241 and the image-side surface 242 of the fourth lens element 240 are aspheric. Furthermore, the image-side surface 242 of the fourth lens element 240 has at least one convex shape in an off-axis region thereof.

The IR-cut filter 260 is made of glass and located between the fourth lens element 240 and the image plane 250, and will not affect the focal length of the image capturing lens assembly.

The detailed optical data of the 2nd embodiment are shown in Table 3 and the aspheric surface data are shown in Table 4 below.

TABLE 3

2nd Embodiment
f = 1.34 mm, Fno = 2.05, HFOV = 44.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.023 | | | | |
| 2 | Lens 1 | 1.255 | ASP | 0.389 | Plastic | 1.544 | 55.9 | 1.23 |
| 3 | | −1.267 | ASP | 0.146 | | | | |
| 4 | Lens 2 | −0.538 | ASP | 0.200 | Plastic | 1.634 | 23.8 | −1.60 |
| 5 | | −1.310 | ASP | 0.030 | | | | |
| 6 | Lens 3 | −1.006 | ASP | 0.298 | Plastic | 1.544 | 55.9 | 2.15 |
| 7 | | −0.598 | ASP | 0.030 | | | | |
| 8 | Lens 4 | 0.443 | ASP | 0.230 | Plastic | 1.544 | 55.9 | 39.69 |
| 9 | | 0.370 | ASP | 0.450 | | | | |

TABLE 3-continued

2nd Embodiment
f = 1.34 mm, Fno = 2.05, HFOV = 44.0 deg.

| Surface # | | Curvature Radius | Thickness | Material | Index | Abbe # | Focal Length |
|---|---|---|---|---|---|---|---|
| 10 | IR-cut filter | Plano | 0.210 | Glass | 1.517 | 64.2 | — |
| 11 | | Plano | 0.154 | | | | |
| 12 | Image | Plano | — | | | | |

Note:
Reference wavelength is 587.6 nm (d-line).

TABLE 4

Aspheric Coefficients

| Surface # | 2 | 3 | 4 | 5 |
|---|---|---|---|---|
| k= | −4.8012E+00 | −3.8287E+00 | −1.4000E+01 | −3.5258E+01 |
| A4= | −3.8558E−01 | −2.2332E+00 | −1.2139E+01 | 1.0709E+00 |
| A6= | 1.6749E+00 | −2.8987E−01 | 9.6633E+01 | −3.6763E+01 |
| A8= | −3.5654E+01 | −4.8797E+01 | −4.5885E+02 | 3.0659E+02 |
| A10= | −5.4542E+01 | 1.6741E+01 | 1.1020E+03 | −1.2813E+03 |
| A12= | | | 3.8744E+02 | 2.6579E+03 |
| A14= | | | −4.4731E+03 | −2.1736E+03 |

| Surface # | 6 | 7 | 8 | 9 |
|---|---|---|---|---|
| k= | 1.1427E+00 | −5.3115E+00 | −5.9834E+00 | −3.5092E+00 |
| A4= | 8.6111E+00 | −3.3577E+00 | 8.3109E−01 | −1.0644E−01 |
| A6= | −7.8934E−01 | 4.9258E+01 | −6.8500E+00 | −1.8344E+01 |
| A8= | 4.7656E+02 | −3.6088E+02 | 1.6218E+01 | 4.9724E+00 |
| A10= | −1.8778E+03 | 1.5696E+03 | −1.9221E+01 | −6.7685E+00 |
| A12= | 4.6987E+03 | −4.0046E+03 | 1.2418E+01 | 5.4385E+00 |
| A14= | −7.0640E+03 | 5.5260E+03 | −4.1489E+00 | −2.4507E+00 |
| A16= | 4.9110E+03 | −3.1629E+03 | 5.5767E−01 | 4.7107E−01 |

In the image capturing lens assembly according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following conditions:

2nd Embodiment

| f [mm] | 1.34 | f/f4 | 0.03 |
|---|---|---|---|
| Fno | 2.05 | (R1 + R2)/(R1 − R2) | 0.00 |
| HFOV [deg.] | 44.0 | SD41/SD32 | 1.49 |
| T12/(T23 + T34) | 2.43 | FOV [deg.] | 88.0 |
| R2/R3 | 2.35 | TL/Tan (HFOV) [mm] | 2.21 |
| R4/R3 | 2.43 | (|Sag100 − Sag80| + | Sag80 − Sag60|)/CT4 | 0.05 |
| f2/f3 | −0.74 | | |

3rd Embodiment

Figure 5:
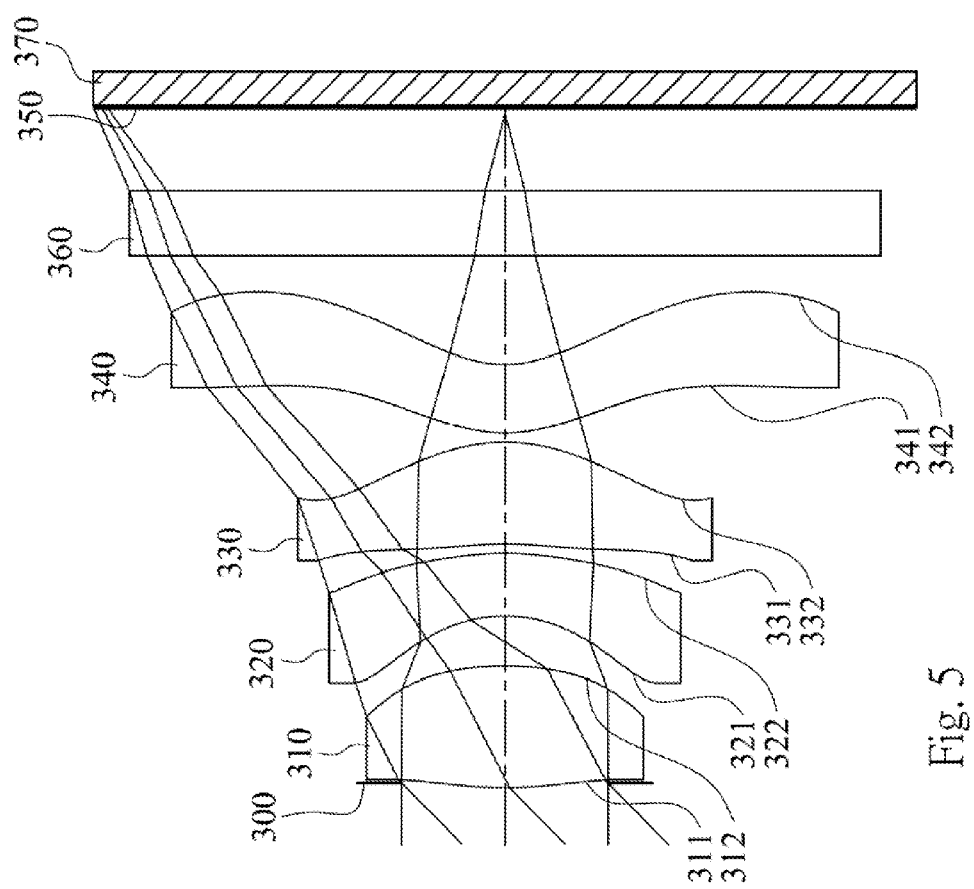
FIG. 5 is a schematic view of an image capturing lens assembly according to the 3rd embodiment of the present disclosure.
Figure 6:
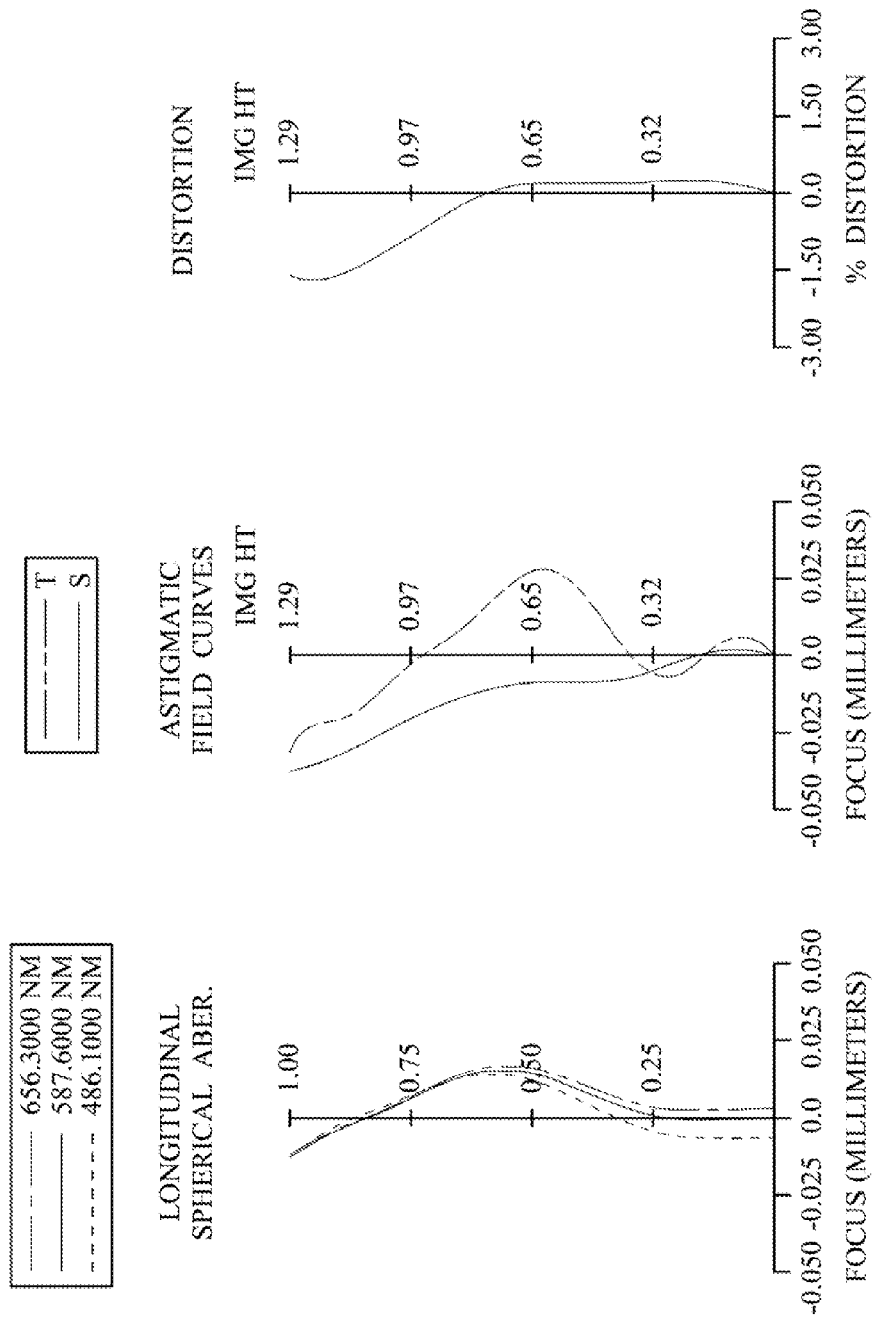
FIG. 6 shows spherical aberration curves, astigmatic field curves and a distortion curve of the image capturing lens assembly according to the 3rd embodiment.

FIG. 5 is a schematic view of an image capturing lens assembly according to the 3rd embodiment of the present disclosure. FIG. 6 shows spherical aberration curves, astigmatic field curves and a distortion curve of the image capturing lens assembly according to the 3rd embodiment. In FIG. 5, the image capturing lens assembly includes, in order from an object side to an image side, an aperture stop 300, a first lens element 310, a second lens element 320, a third lens element 330, a fourth lens element 340, an IR-cut filter 360, an image plane 350 and an image sensor 370, wherein the image capturing lens assembly has a total of four lens elements (310-340) with refractive power.

The first lens element 310 with positive refractive power has a convex object-side surface 311 in a paraxial region thereof and a convex image-side surface 312 in a paraxial region thereof, and is made of plastic material. The object-side surface 311 and the image-side surface 312 of the first lens element 310 are aspheric.

The second lens element 320 with negative refractive power has a concave object-side surface 321 in a paraxial region thereof and a convex image-side surface 322 in a paraxial region thereof, and is made of plastic material. The object-side surface 321 and the image-side surface 322 of the second lens element 320 are aspheric.

The third lens element 330 with positive refractive power has a concave object-side surface 331 in a paraxial region thereof and a convex image-side surface 332 in a paraxial region thereof, and is made of plastic material. The object-side surface 331 and the image-side surface 332 of the third lens element 330 are aspheric.

The fourth lens element 340 with negative refractive power has a convex object-side surface 341 in a paraxial region thereof and a concave image-side surface 342 in a paraxial region thereof, and is made of plastic material. The object-side surface 341 and the image-side surface 342 of the fourth lens element 340 are aspheric. Furthermore, the image-side surface 342 of the fourth lens element 340 has at least one convex shape in an off-axis region thereof.

The IR-cut filter 360 is made of glass and located between the fourth lens element 340 and the image plane 350, and will not affect the focal length of the image capturing lens assembly.

The detailed optical data of the 3rd embodiment are shown in Table 5 and the aspheric surface data are shown in Table 6 below.

TABLE 5

3rd Embodiment
f = 1.36 mm, Fno = 2.05, HFOV = 44.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.015 | | | | |

TABLE 5-continued

3rd Embodiment
f = 1.36 mm, Fno = 2.05, HFOV = 44.0 deg.

| Surface # | | Curvature Radius | | Thickness | Material | Index | Abbe # | Focal Length |
|---|---|---|---|---|---|---|---|---|
| 2 | Lens 1 | 1.461 | ASP | 0.389 | Plastic | 1.544 | 55.9 | 1.17 |
| 3 | | −1.028 | ASP | 0.162 | | | | |
| 4 | Lens 2 | −0.465 | ASP | 0.200 | Plastic | 1.634 | 23.8 | −1.87 |
| 5 | | −0.892 | ASP | 0.030 | | | | |
| 6 | Lens 3 | −1.006 | ASP | 0.327 | Plastic | 1.544 | 55.9 | 2.06 |
| 7 | | −0.591 | ASP | 0.030 | | | | |
| 8 | Lens 4 | 0.482 | ASP | 0.220 | Plastic | 1.544 | 55.9 | −9.58 |
| 9 | | 0.370 | ASP | 0.350 | | | | |
| 10 | IR-cut filter | Plano | | 0.210 | Glass | 1.517 | 64.2 | — |
| 11 | | Plano | | 0.268 | | | | |
| 12 | Image | Plano | | | | | | |

Note:
Reference wavelength is 587.6 nm (d-line).

TABLE 6

Aspheric Coefficients

| Surface # | 2 | 3 | 4 | 5 |
|---|---|---|---|---|
| k= | −5.6662E+00 | −5.0331E+00 | −1.2165E+01 | −2.1728E+01 |
| A4= | −6.6618E−01 | −1.9616E+00 | −1.2488E+01 | 7.4357E−01 |
| A6= | 5.4429E+00 | −1.8412E+00 | 1.4117E+02 | −1.8092E+01 |
| A8= | −8.9886E+01 | 1.3897E+01 | −1.0931E+03 | 1.3700E+02 |
| A10= | 1.9732E+02 | −1.2404E+02 | 5.1469E+03 | −5.6960E+02 |
| A12= | | 4.7961E+02 | −1.2079E+04 | 1.1588E+03 |
| A14= | | | 1.0844E+04 | −8.4383E+02 |

| Surface # | 6 | 7 | 8 | 9 |
|---|---|---|---|---|
| k= | 9.8523E−01 | −4.8872E+00 | −5.2498E+00 | −3.1783E+00 |
| A4= | 7.1104E+00 | −2.4021E+00 | 2.5747E−01 | −4.9170E−01 |
| A6= | −5.9925E+01 | 2.6215E+00 | −4.5027E+00 | −3.6422E−01 |
| A8= | 3.3556E+02 | −1.6375E+02 | 1.1399E+01 | 1.9699E+00 |
| A10= | −1.2327E+03 | 6.0819E+02 | −1.3277E+01 | −3.0615E+00 |
| A12= | 2.8809E+03 | −1.2467E+03 | 7.7493E+00 | 2.5809E+00 |
| A14= | −3.9373E+03 | 1.3349E+03 | 1.9428E+00 | −1.1949E+00 |
| A16= | 2.4258E+03 | −5.9596E+02 | 7.6332E−02 | 2.3454E−01 |

In the image capturing lens assembly according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following conditions:

3rd Embodiment

| | | | |
|---|---|---|---|
| f [mm] | 1.36 | f/f4 | −0.14 |
| Fno | 2.05 | (R1 + R2)/(R1 − R2) | 0.17 |
| HFOV [deg.] | 44.0 | SD41/SD32 | 1.44 |
| T12/(T23 + T34) | 2.70 | FOV [deg.] | 88.0 |
| R2/R3 | 2.21 | TL/Tan(HFOV) [mm] | 2.26 |
| R4/R3 | 1.92 | (\|Sag100 − Sag80\| + \|Sag80 − Sag60\|)/CT4 | 0.06 |
| f2/f3 | −0.91 | | |

4th Embodiment

Figure 7:
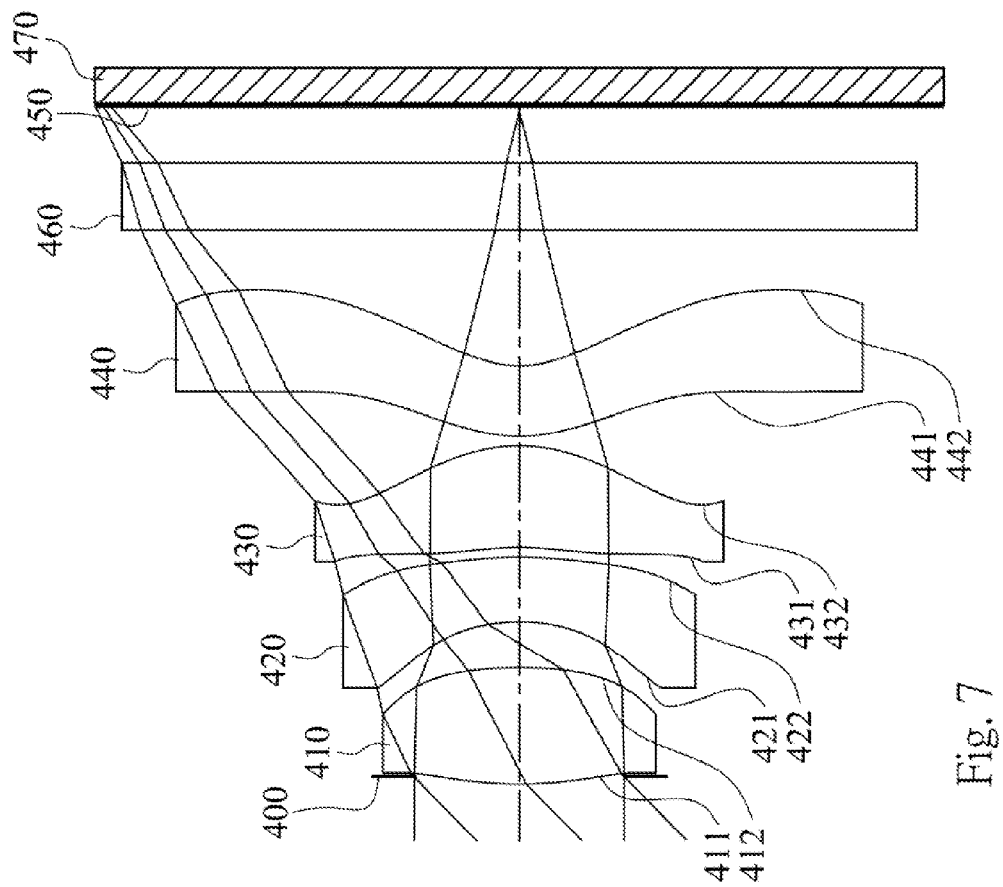
FIG. 7 is a schematic view of an image capturing lens assembly according to the 4th embodiment of the present disclosure.
Figure 8:
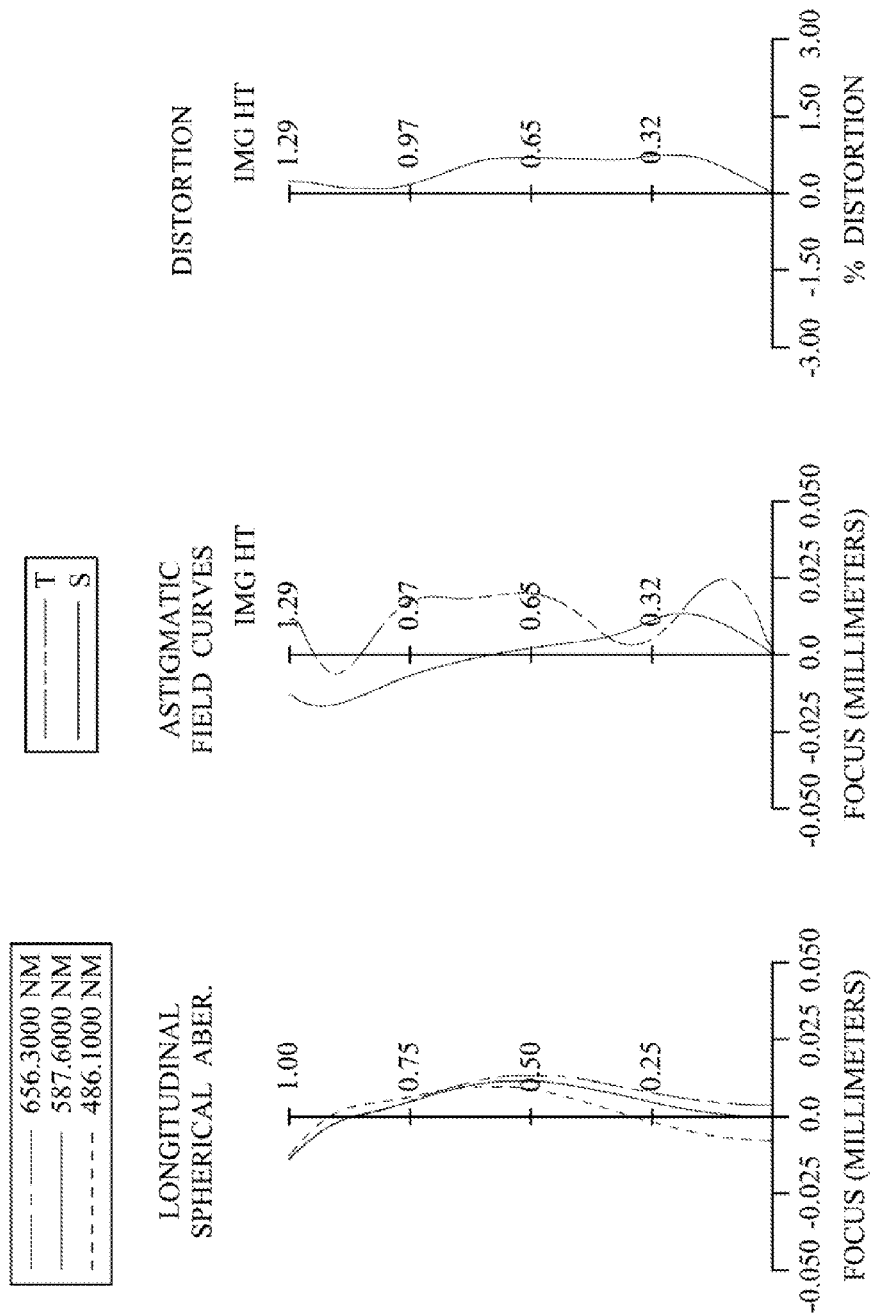
FIG. 8 shows spherical aberration curves, astigmatic field curves and a distortion curve of the image capturing lens assembly according to the 4th embodiment.

FIG. 7 is a schematic view of an image capturing lens assembly according to the 4th embodiment of the present disclosure. FIG. 8 shows spherical aberration curves, astigmatic field curves and a distortion curve of the image capturing lens assembly according to the 4th embodiment. In FIG. 7, the image capturing lens assembly includes, in order from an object side to an image side, an aperture stop 400, a first lens element 410, a second lens element 420, a third lens element 430, a fourth lens element 440, an IR-cut filter 460, an image plane 450 and an image sensor 470, wherein the image capturing lens assembly has a total of four lens elements (410-440) with refractive power.

The first lens element 410 with positive refractive power has a convex object-side surface 411 in a paraxial region thereof and a convex image-side surface 412 in a paraxial region thereof, and is made of plastic material. The object-side surface 411 and the image-side surface 412 of the first lens element 410 are aspheric.

The second lens element 420 with negative refractive power has a concave object-side surface 421 in a paraxial region thereof and a convex image-side surface 422 in a paraxial region thereof, and is made of plastic material. The object-side surface 421 and the image-side surface 422 of the second lens element 420 are aspheric.

The third lens element 430 with positive refractive power has a concave object-side surface 431 in a paraxial region thereof and a convex image-side surface 432 in a paraxial region thereof, and is made of plastic material. The object-side surface 431 and the image-side surface 432 of the third lens element 430 are aspheric.

The fourth lens element 440 with negative refractive power has a convex object-side surface 441 in a paraxial region thereof and a concave image-side surface 442 in a paraxial region thereof, and is made of plastic material. The object-side surface 441 and the image-side surface 442 of the fourth lens element 440 are aspheric. Furthermore, the image-side surface 442 of the fourth lens element 440 has at least one convex shape in an off-axis region thereof.

The IR-cut filter 460 is made of glass and located between the fourth lens element 440 and the image plane 450, and will not affect the focal length of the image capturing lens assembly.

The detailed optical data of the 4th embodiment are shown in Table 7 and the aspheric surface data are shown in Table 8 below.

TABLE 7

4th Embodiment
f = 1.34 mm, Fno = 2.05, HFOV = 44.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.023 | | | | |
| 2 | Lens 1 | 1.224 | ASP | 0.361 | Plastic | 1.544 | 55.9 | 1.25 |
| 3 | | −1.380 | ASP | 0.143 | | | | |
| 4 | Lens 2 | −0.586 | ASP | 0.200 | Plastic | 1.634 | 23.8 | −2.25 |
| 5 | | −1.127 | ASP | 0.030 | | | | |
| 6 | Lens 3 | −0.795 | ASP | 0.316 | Plastic | 1.544 | 55.9 | 1.86 |
| 7 | | −0.508 | ASP | 0.030 | | | | |
| 8 | Lens 4 | 0.470 | ASP | 0.220 | Plastic | 1.544 | 55.9 | −5.51 |
| 9 | | 0.340 | ASP | 0.420 | | | | |
| 10 | IR-cut filter | Plano | | 0.210 | Glass | 1.517 | 64.2 | — |
| 11 | | Plano | | 0.181 | | | | |
| 12 | Image | Plano | | — | | | | |

Note:
Reference wavelength is 587.6 nm (d-line).

TABLE 8

Aspheric Coefficients

| Surface # | 2 | 3 | 4 | 5 |
|---|---|---|---|---|
| k= | −4.8012E+00 | −3.8287E+00 | −1.4000E+01 | −3.5258E+01 |
| A4= | −1.8084E−01 | −2.2176E+00 | −9.7639E+00 | 1.4881E+00 |
| A6= | −2.8518E+00 | 1.4170E+00 | 6.8234E+01 | −2.3945E+01 |
| A8= | 6.9528E+00 | −3.9623E+01 | −3.2572E+02 | 1.4274E+02 |
| A10= | −2.3348E+02 | 1.1830E+02 | 5.2162E+02 | −5.1568E+02 |
| A12= | | | 3.1954E+03 | 9.8487E+02 |
| A14= | | | −1.0100E+04 | −7.2049E+02 |

| Surface # | 6 | 7 | 8 | 9 |
|---|---|---|---|---|
| k= | 7.9099E−02 | −5.3114E+00 | −5.9834E+00 | −3.5093E+00 |
| A4= | 9.1724E+00 | −3.6891E+00 | 2.0090E−01 | −3.9392E−01 |
| A6= | −7.4553E+01 | 4.1706E+01 | −3.8589E+00 | −6.3704E−01 |
| A8= | 4.0305E+02 | −2.7647E+02 | 7.3912E+00 | 2.4491E+00 |
| A10= | −1.4251E+03 | 1.1351E+03 | −1.8084E+00 | −3.7243E+00 |
| A12= | 3.1957E+03 | −2.6238E+03 | −8.1416E+00 | 3.3973E+00 |
| A14= | −4.1620E+03 | 3.1777E+03 | 8.6658E+00 | −1.7825E+00 |
| A16= | 2.3383E+03 | −1.5967E+03 | −2.6705E+00 | 3.9677E−01 |

In the image capturing lens assembly according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following conditions:

| 4th Embodiment | | | |
|---|---|---|---|
| f [mm] | 1.34 | f/f4 | −0.24 |
| Fno | 2.05 | (R1 + R2)/(R1 − R2) | −0.06 |
| HFOV [deg.] | 44.0 | SD41/SD32 | 1.48 |
| T12/(T23 + T34) | 2.38 | FOV [deg.] | 88.0 |
| R2/R3 | 2.35 | TL/Tan(HFOV) [mm] | 2.19 |
| R4/R3 | 1.92 | (|Sag100 − Sag80| + |Sag80 − Sag60|)/CT4 | 0.02 |
| f2/f3 | −1.21 | | |

5th Embodiment

Figure 9:
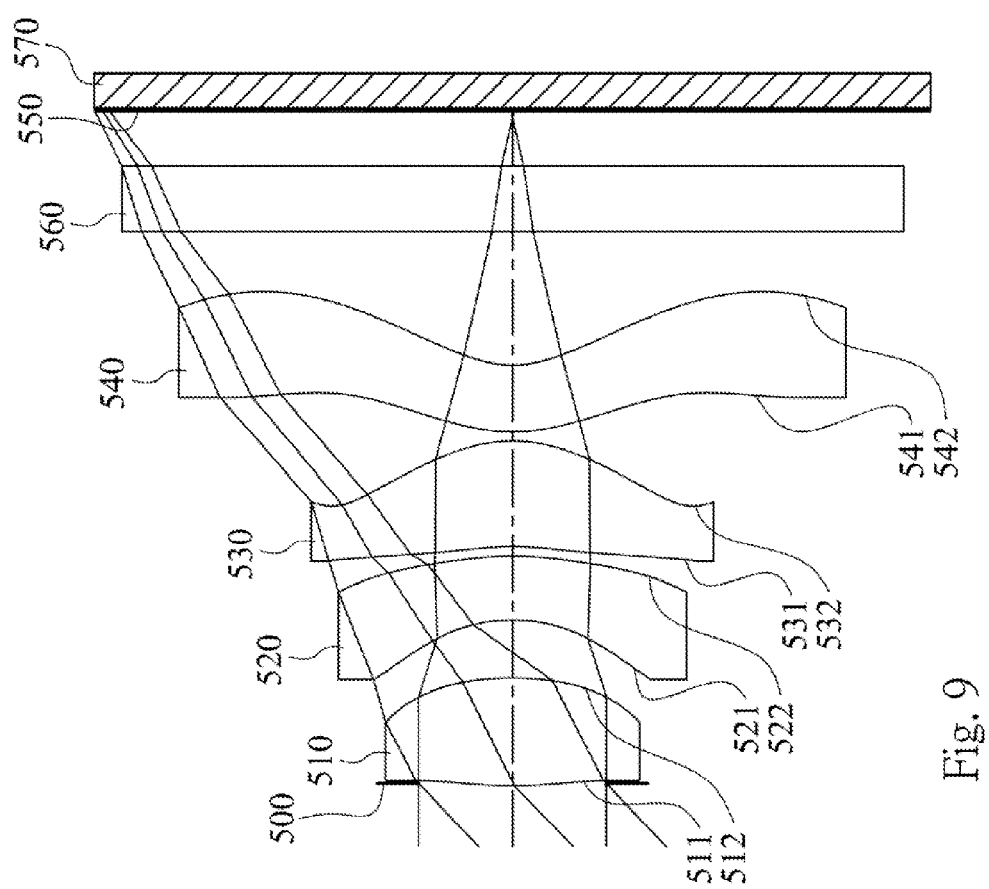
FIG. 9 is a schematic view of an image capturing lens assembly according to the 5th embodiment of the present disclosure.
Figure 10:
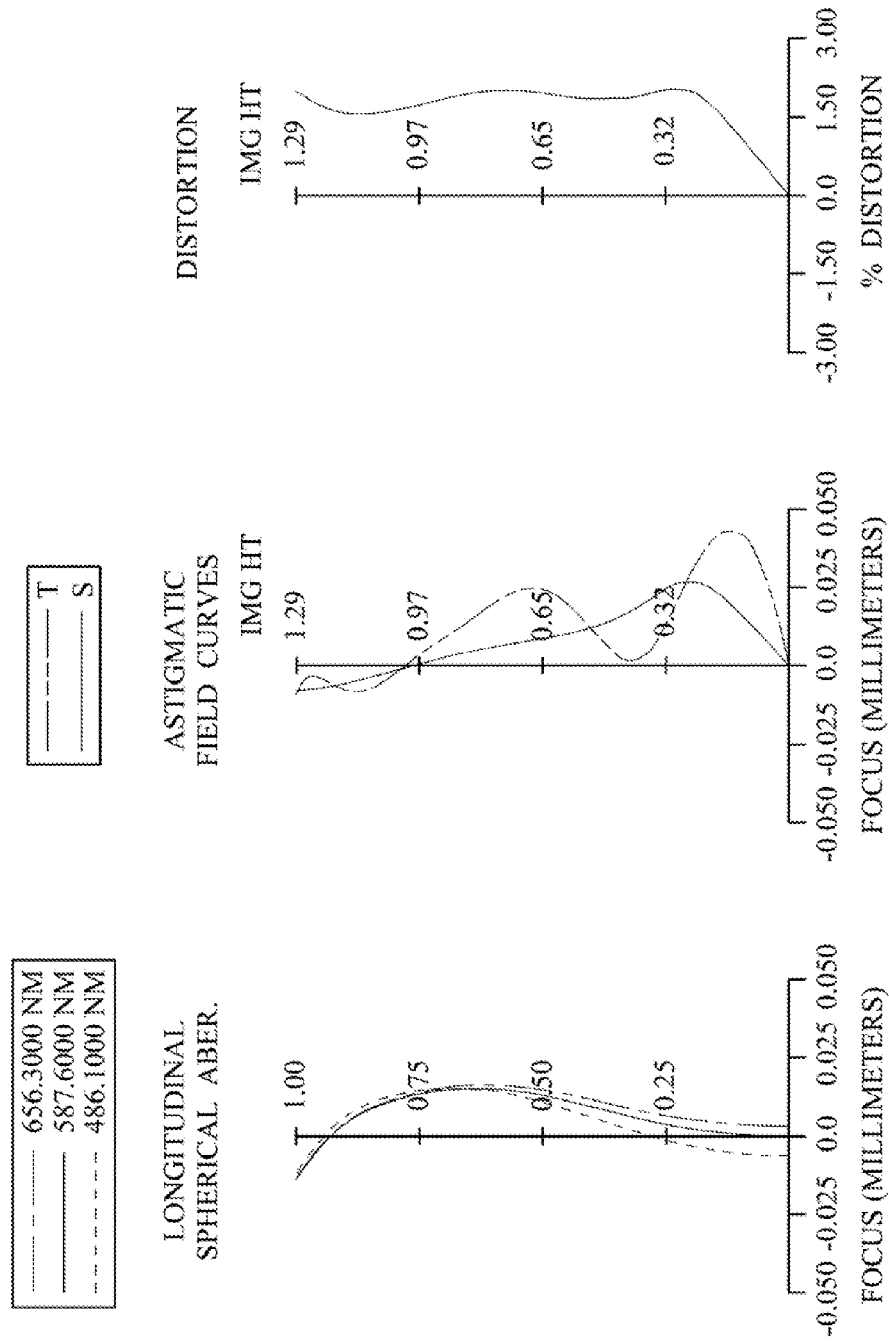
FIG. 10 shows spherical aberration curves, astigmatic field curves and a distortion curve of the image capturing lens assembly according to the 5th embodiment.

FIG. 9 is a schematic view of an image capturing lens assembly according to the 5th embodiment of the present disclosure. FIG. 10 shows spherical aberration curves, astigmatic field curves and a distortion curve of the image capturing lens assembly according to the 5th embodiment. In FIG. 9, the image capturing lens assembly includes, in order from an object side to an image side, an aperture stop 500, a first lens element 510, a second lens element 520, a third lens element 530, a fourth lens element 540, an IR-cut filter 560, an image plane 550 and an image sensor 570, wherein the image capturing lens assembly has a total of four lens elements (510-540) with refractive power.

The first lens element 510 with positive refractive power has a convex object-side surface 511 in a paraxial region thereof and a convex image-side surface 512 in a paraxial region thereof, and is made of glass material. The object-side surface 511 and the image-side surface 512 of the first lens element 510 are aspheric.

The second lens element 520 with negative refractive power has a concave object-side surface 521 in a paraxial region thereof and a convex image-side surface 522 in a paraxial region thereof, and is made of plastic material. The object-side surface 521 and the image-side surface 522 of the second lens element 520 are aspheric.

The third lens element 530 with positive refractive power has a concave object-side surface 531 in a paraxial region thereof and a convex image-side surface 532 in a paraxial region thereof, and is made of plastic material. The object-side surface 531 and the image-side surface 532 of the third lens element 530 are aspheric.

The fourth lens element 540 with negative refractive power has a convex object-side surface 541 in a paraxial region thereof and a concave image-side surface 542 in a paraxial region thereof, and is made of plastic material. The object-side surface 541 and the image-side surface 542 of the fourth lens element 540 are aspheric. Furthermore, the image-side surface 542 of the fourth lens element 540 has at least one convex shape in an off-axis region thereof.

The IR-cut filter 560 is made of glass and located between the fourth lens element 540 and the image plane 550, and will not affect the focal length of the image capturing lens assembly.

The detailed optical data of the 5th embodiment are shown in Table 9 and the aspheric surface data are shown in Table 10 below.

TABLE 9

5th Embodiment
f = 1.33 mm, Fno = 2.25, HFOV = 43.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.006 | | | | |
| 2 | Lens 1 | 1.626 | ASP | 0.338 | Glass | 1.542 | 62.9 | 1.19 |
| 3 | | −0.998 | ASP | 0.185 | | | | |
| 4 | Lens 2 | −0.514 | ASP | 0.200 | Plastic | 1.634 | 23.8 | −2.32 |
| 5 | | −0.910 | ASP | 0.030 | | | | |
| 6 | Lens 3 | −0.806 | ASP | 0.334 | Plastic | 1.544 | 55.9 | 1.32 |
| 7 | | −0.436 | ASP | 0.030 | | | | |
| 8 | Lens 4 | 0.577 | ASP | 0.210 | Plastic | 1.544 | 55.9 | −2.22 |
| 9 | | 0.340 | ASP | 0.420 | | | | |
| 10 | IR-cut filter | Plano | | 0.210 | Glass | 1.517 | 64.2 | — |
| 11 | | Plano | | 0.177 | | | | |
| 12 | Image | Plano | | — | | | | |

Note:
Reference wavelength is 587.6 nm (d-line).

TABLE 10

Aspheric Coefficients

| Surface # | 2 | 3 | 4 | 5 |
|---|---|---|---|---|
| k= | −7.1184E+00 | −3.9906E+00 | −1.1354E+01 | −2.6040E+01 |
| A4= | −7.4737E−01 | −2.3852E+00 | −9.4453E+00 | 1.8850E+00 |
| A6= | −2.4987E−01 | 3.6883E+00 | 7.1538E+01 | −3.9635E+01 |
| A8= | −5.9860E+01 | −4.0817E+01 | −2.1755E+02 | 3.2246E+02 |
| A10= | 3.6155E+01 | 7.6774E+01 | −7.9003E+02 | −1.3713E+03 |
| A12= | | | 8.3322E+03 | 2.9114E+03 |
| A14= | | | −1.7507E+04 | −2.4459E+03 |

| Surface # | 6 | 7 | 8 | 9 |
|---|---|---|---|---|
| k= | 1.3419E−01 | −5.3272E+00 | −4.6648E+00 | −3.6411E+00 |
| A4= | 8.9418E+00 | −2.4420E+00 | −2.9494E−01 | −3.6458E−01 |
| A6= | −8.3021E+01 | 1.8778E+01 | −1.7262E+00 | −6.4441E−01 |
| A8= | 4.9341E+02 | −6.7652E+01 | 3.0695E+00 | 2.3928E+00 |
| A10= | −1.8318E+03 | 2.3821E−01 | 1.3410E+00 | −3.5202E+00 |
| A12= | 4.1780E+03 | 8.0443E+02 | −7.0441E+00 | 2.8294E+00 |
| A14= | −5.2572E+03 | −2.0512E+03 | 6.2124E+00 | −1.2041E+00 |
| A16= | 2.6696E+03 | 1.5428E+03 | −1.8336E+00 | 2.1090E−01 |

In the image capturing lens assembly according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following conditions:

5th Embodiment

| f[mm] | 1.33 | f/f4 | −0.60 |
|---|---|---|---|
| Fno | 2.25 | (R1 + R2)/(R1 − R2) | 0.24 |
| HFOV [deg.] | 43.5 | SD41/SD32 | 1.46 |
| T12/(T23 + T34) | 3.08 | FOV [deg.] | 87.0 |
| R2/R3 | 1.94 | TL/Tan(HFOV) [mm] | 2.25 |
| R4/R3 | 1.77 | (|Sag100 − Sag80| + |Sag80 − Sag60|)/CT4 | 0.06 |
| f2/f3 | −1.76 | | |

6th Embodiment

Figure 11:
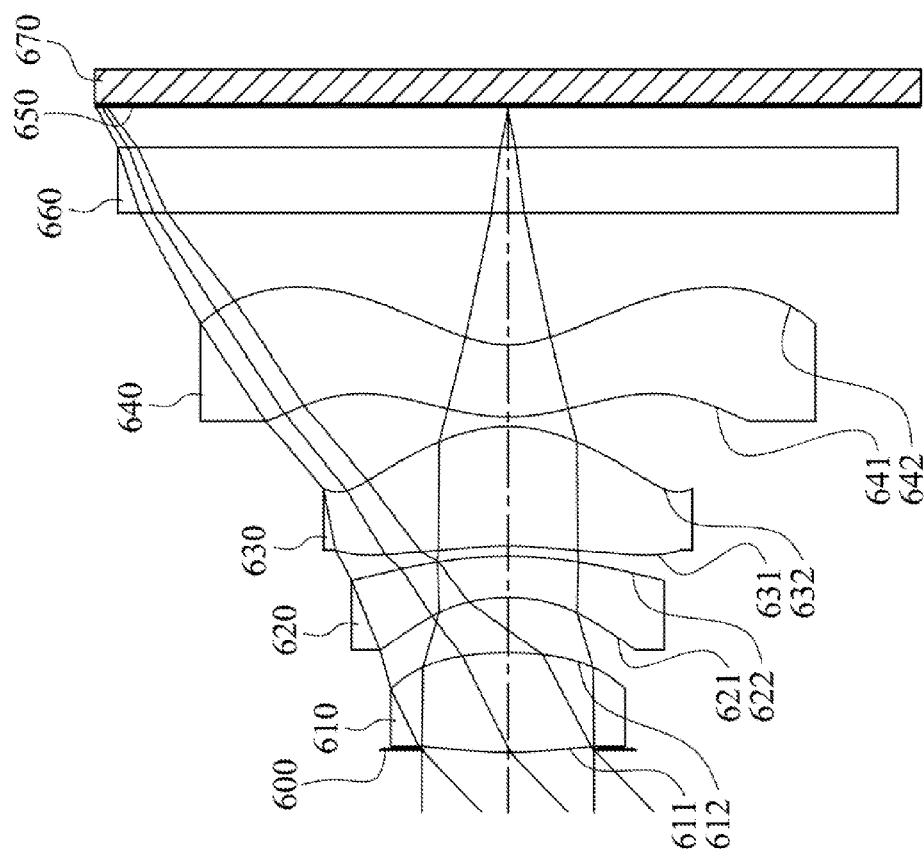
FIG. 11 is a schematic view of an image capturing lens assembly according to the 6th embodiment of the present disclosure.
Figure 12:
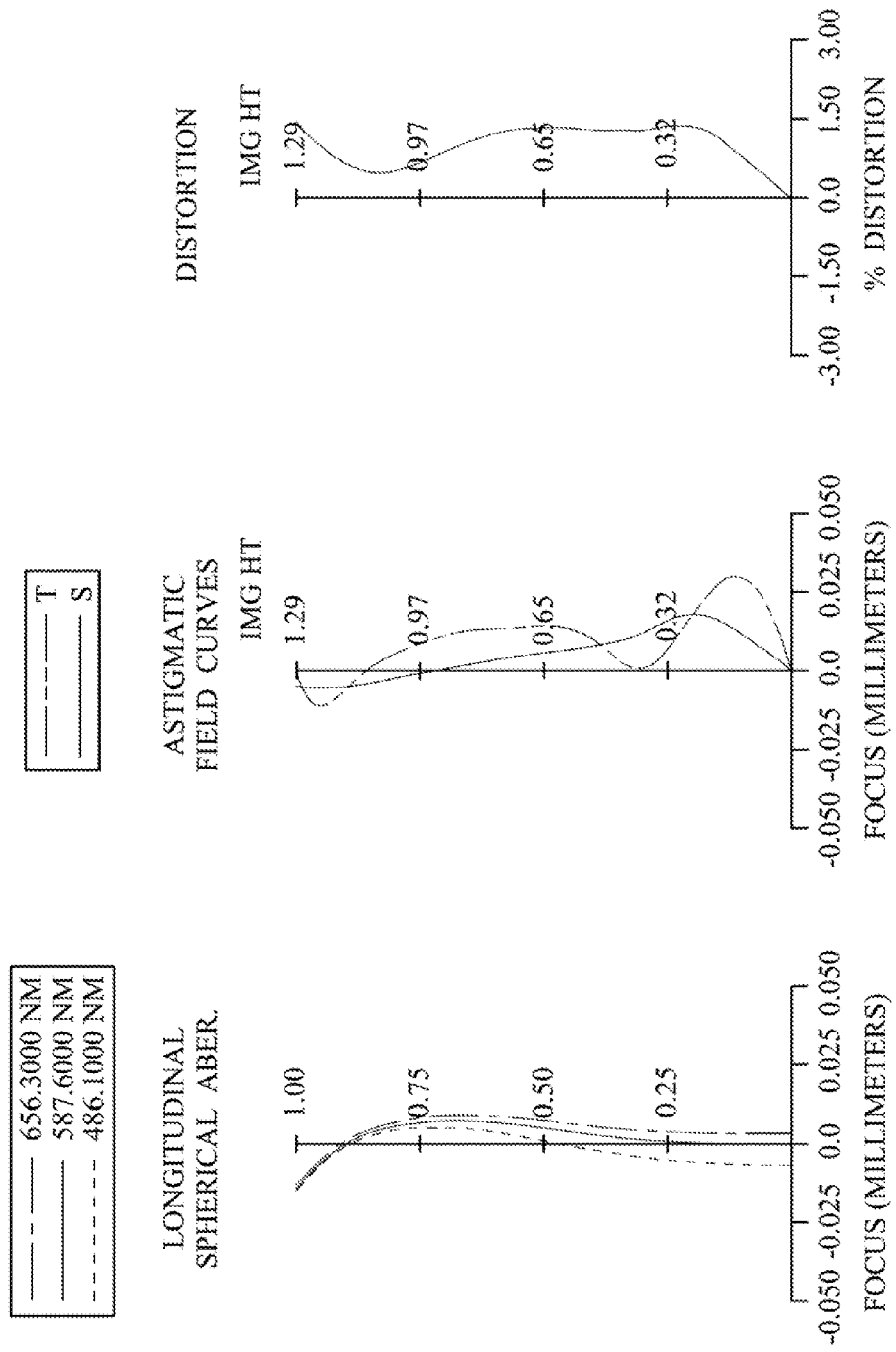
FIG. 12 shows spherical aberration curves, astigmatic field curves and a distortion curve of the image capturing lens assembly according to the 6th embodiment.

FIG. 11 is a schematic view of an image capturing lens assembly according to the 6th embodiment of the present disclosure. FIG. 12 shows spherical aberration curves, astigmatic field curves and a distortion curve of the image capturing lens assembly according to the 6th embodiment. In FIG. 11, the image capturing lens assembly includes, in order from an object side to an image side, an aperture stop 600, a first lens element 610, a second lens element 620, a third lens element 630, a fourth lens element 640, an IR-cut filter 660, an image plane 650 and an image sensor 670, wherein the image capturing lens assembly has a total of four lens elements (610-640) with refractive power.

The first lens element 610 with positive refractive power has a convex object-side surface 611 in a paraxial region thereof and a convex image-side surface 612 in a paraxial region thereof, and is made of plastic. The object-side surface 611 and the image-side surface 612 of the first lens element 610 are aspheric.

The second lens element 620 with negative refractive power has a concave object-side surface 621 in a paraxial region thereof and a convex image-side surface 622 in a paraxial region thereof, and is made of plastic material. The object-side surface 621 and the image-side surface 622 of the second lens element 620 are aspheric.

The third lens element 630 with positive refractive power has a concave object-side surface 631 in a paraxial region thereof and a convex image-side surface 632 in a paraxial region thereof, and is made of plastic material. The object-side surface 631 and the image-side surface 632 of the third lens element 630 are aspheric.

The fourth lens element 640 with negative refractive power has a convex object-side surface 641 in a paraxial region thereof and a concave image-side surface 642 in a paraxial region thereof, and is made of plastic material. The object-side surface 641 and the image-side surface 642 of the fourth lens element 640 are aspheric. Furthermore, the image-side surface 642 of the fourth lens element 640 has at least one convex shape in an off-axis region thereof.

The IR-cut filter 660 is made of glass and located between the fourth lens element 640 and the image plane 650, and will not affect the focal length of the image capturing lens assembly.

The detailed optical data of the 6th embodiment are shown in Table 11 and the aspheric surface data are shown in Table 12 below.

TABLE 11

6th Embodiment
f = 1.34 mm, Fno = 2.45, HFOV = 43.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.008 | | | | |
| 2 | Lens 1 | 1.465 | ASP | 0.315 | Plastic | 1.544 | 55.9 | 1.19 |
| 3 | | −1.079 | ASP | 0.177 | | | | |
| 4 | Lens 2 | −0.559 | ASP | 0.130 | Plastic | 1.634 | 23.8 | −1.90 |
| 5 | | −1.137 | ASP | 0.033 | | | | |
| 6 | Lens 3 | −0.972 | ASP | 0.380 | Plastic | 1.544 | 55.9 | 1.17 |
| 7 | | −0.437 | ASP | 0.032 | | | | |
| 8 | Lens 4 | 0.623 | ASP | 0.227 | Plastic | 1.535 | 55.7 | −1.84 |
| 9 | | 0.333 | ASP | 0.420 | | | | |
| 10 | IR-cut filter | Plano | | 0.210 | Glass | 1.517 | 64.2 | |
| 11 | | Plano | | 0.134 | | | | |
| 12 | Image | Plano | | — | | | | |

Note:
Reference wavelength is 587.6 nm (d-line).

TABLE 12

Aspheric Coefficients

| Surface | 2 | 3 | 4 | 5 |
|---|---|---|---|---|
| k= | 7.9108E+00 | −4.6670E+00 | −1.1616E+01 | −1.2229E+01 |
| A4= | −1.2651E+00 | −2.5911E+00 | −9.5775E+00 | 1.9451E+00 |
| A6= | −3.6542E+00 | 1.5630E+00 | 6.8649E+01 | −3.8588E+01 |
| A8= | −4.4135E+01 | −3.2291E+01 | −1.8659E+02 | 3.2246E+02 |
| A10= | −7.9372E+01 | 4.5918E+01 | −8.5143E+02 | −1.3688E+03 |
| A12= | | | 8.3322E+03 | 2.9114E+03 |
| A14= | | | −1.7507E+04 | −2.4459E+03 |

| Surface # | 6 | 7 | 8 | 9 |
|---|---|---|---|---|
| k= | 5.0888E−01 | −5.3272E+00 | −4.6648E+00 | −3.6411E+00 |
| A4= | 7.1970E+00 | −2.5843E+00 | −1.1771E+00 | −8.2441E−01 |
| A6= | −6.5905E+01 | 1.6305E+01 | 1.3164E−01 | 2.7481E−01 |
| A8= | 3.3867E+02 | −4.2343E+01 | −6.4204E−01 | 2.1776E+00 |
| A10= | −9.0411E+02 | −1.3428E+02 | 7.3450E+00 | −6.3554E+00 |
| A12= | 1.2250E+03 | 1.1282E+03 | −1.2987E+01 | 8.1342E+00 |
| A14= | −5.9730E+02 | −2.0464E+03 | 9.9727E+00 | −5.1660E+00 |
| A16= | −1.8033E+02 | 9.2343E+02 | −3.0573E+00 | 1.3024E+00 |

In the image capturing lens assembly according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following conditions:

| 6th Embodiment | | | |
|---|---|---|---|
| f[mm] | 1.34 | f/f4 | −0.73 |
| Fno | 2.45 | (R1 + R2)/(R1 − R2) | 0.15 |
| HFOV [deg.] | 43.5 | SD41/SD32 | 1.31 |
| T12/(T23 + T34) | 2.72 | FOV [deg.] | 87.0 |
| R2/R3 | 1.93 | TL/Tan(HFOV) [mm] | 2.17 |
| R4/R3 | 2.03 | (|Sag100 − Sag80| + |Sag80 − Sag60|)/CT4 | 0.39 |
| f2/f3 | −1.62 | | |

7th Embodiment

Figure 13:
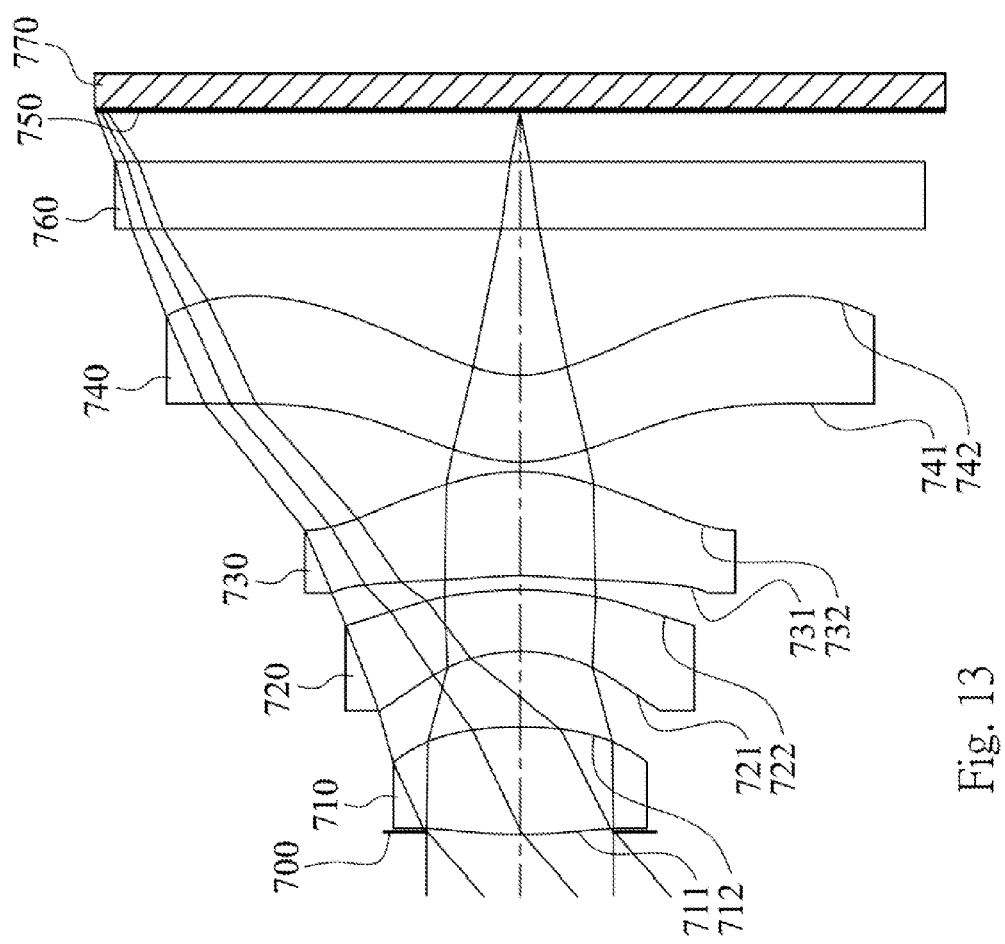
FIG. 13 is a schematic view of an image capturing lens assembly according to the 7th embodiment of the present disclosure.
Figure 14:
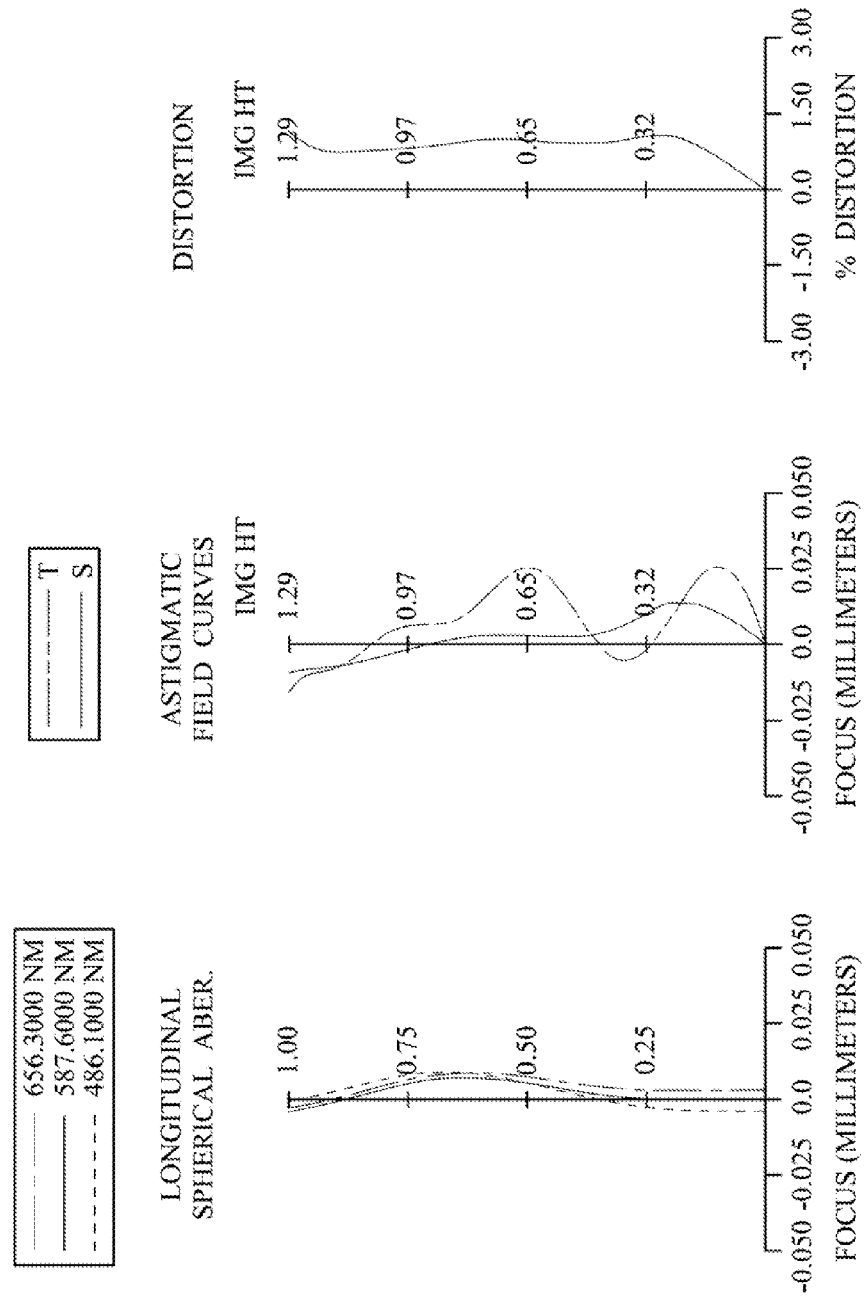
FIG. 14 shows spherical aberration curves, astigmatic field curves and a distortion curve of the image capturing lens assembly according to the 7th embodiment.

FIG. 13 is a schematic view of an image capturing lens assembly according to the 7th embodiment of the present disclosure. FIG. 14 shows spherical aberration curves, astigmatic field curves and a distortion curve of the image capturing lens assembly according to the 7th embodiment. In FIG. 13, the image capturing lens assembly includes, in order from an object side to an image side, an aperture stop 700, a first lens element 710, a second lens element 720, a third lens element 730, a fourth lens element 740, an IR-cut filter 760, an image plane 750 and an image sensor 770, wherein the image capturing lens assembly has a total of four lens elements (710-740) with refractive power.

The first lens element 710 with positive refractive power has a convex object-side surface 711 in a paraxial region thereof and a convex image-side surface 712 in a paraxial region thereof, and is made of plastic material. The object-side surface 711 and the image-side surface 712 of the first lens element 710 are aspheric.

The second lens element 720 with negative refractive power has a concave object-side surface 721 in a paraxial region thereof and a convex image-side surface 722 in a paraxial region thereof, and is made of plastic material. The object-side surface 721 and the image-side surface 722 of the second lens element 720 are aspheric.

The third lens element 730 with positive refractive power has a concave object-side surface 731 in a paraxial region thereof and a convex image-side surface 732 in a paraxial region thereof, and is made of plastic material. The object-side surface 731 and the image-side surface 732 of the third lens element 730 are aspheric.

The fourth lens element 740 with positive refractive power has a convex object-side surface 741 in a paraxial region thereof and a concave image-side surface 742 in a paraxial region thereof, and is made of plastic material. The object-side surface 741 and the image-side surface 742 of the fourth lens element 740 are aspheric. Furthermore, the image-side surface 742 of the fourth lens element 740 has at least one convex shape in an off-axis region thereof.

The IR-cut filter 760 is made of glass and located between the fourth lens element 740 and the image plane 750, and will not affect the focal length of the image capturing lens assembly.

The detailed optical data of the 7th embodiment are shown in Table 13 and the aspheric surface data are shown in Table 14 below.

TABLE 13

7th Embodiment
f = 1.44 mm, Fno = 2.50, HFOV = 41.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.008 | | | | |
| 2 | Lens 1 | 1.589 | ASP | 0.332 | Plastic | 1.544 | 55.9 | 1.31 |
| 3 | | −1.204 | ASP | 0.233 | | | | |
| 4 | Lens 2 | −0.536 | ASP | 0.190 | Plastic | 1.650 | 21.4 | −1.87 |
| 5 | | −1.093 | ASP | 0.043 | | | | |
| 6 | Lens 3 | −0.977 | ASP | 0.321 | Plastic | 1.530 | 55.8 | 3.18 |
| 7 | | −0.689 | ASP | 0.030 | | | | |
| 8 | Lens 4 | 0.453 | ASP | 0.270 | Plastic | 1.530 | 55.8 | 9.52 |
| 9 | | 0.395 | ASP | 0.450 | | | | |
| 10 | IR-cut filter | Plano | | 0.210 | Glass | 1.517 | 64.2 | — |
| 11 | | Plano | | 0.159 | | | | |
| 12 | Image | Plano | | — | | | | |

Note:
Reference wavelength is 587.6 nm (d-line).

TABLE 14

Aspheric Coefficients

| Surface # | 2 | 3 | 4 | 5 |
|---|---|---|---|---|
| k= | −4.8012E+00 | −3.8287E+00 | −1.3885E+01 | −3.5258E+01 |
| A4= | −6.3725E−01 | −1.8807E+00 | −1.0569E+01 | 9.2419E−01 |
| A6= | −3.4609E+00 | −1.9947E+00 | 8.3513E+01 | −5.0852E+01 |
| A8= | −5.8536E+00 | 1.1359E+01 | −3.7281E+02 | 4.8186E+02 |
| A10= | −1.3792E+02 | −6.7795E+01 | 1.0263E+03 | −2.0872E+03 |
| A12= | | | −9.1648E+02 | 4.4407E+03 |
| A14= | | | −1.4432E+03 | −3.7709E+03 |

| Surface # | 6 | 7 | 8 | 9 |
|---|---|---|---|---|
| k= | 8.7856E−01 | −4.9582E+00 | −5.9336E+00 | −3.3034E+00 |
| A4= | 9.3870E+00 | −2.4440E+00 | 6.4449E−01 | −3.9287E−01 |
| A6= | −1.0535E+02 | 3.5419E+01 | −6.0080E+00 | −3.3902E−01 |
| A8= | 7.2949E+02 | −2.5540E+02 | 1.6280E+01 | 1.4917E+00 |
| A10= | −3.1369E+03 | 1.0244E+03 | −2.3176E+01 | −1.9312E+00 |
| A12= | 8.3651E+03 | −2.2740E+03 | 1.8652E+01 | 1.2192E+00 |
| A14= | −1.2798E+04 | 2.6260E+03 | 7.9973E+00 | −3.8625E−01 |
| A16= | 8.5517E+03 | −1.2295E+03 | 1.4198E+00 | 5.0911E−02 |

In the image capturing lens assembly according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following conditions:

| 7th Embodiment | | | |
|---|---|---|---|
| f[mm] | 1.44 | f/f4 | 0.15 |
| Fno | 2.50 | (R1 + R2)/(R1 − R2) | 0.14 |
| HFOV [deg.] | 41.5 | SD41/SD32 | 1.47 |
| T12/(T23 + T34) | 3.19 | FOV [deg.] | 83.0 |
| R2/R3 | 2.25 | TL/Tan(HFOV) [mm] | 2.53 |
| R4/R3 | 2.04 | (\|Sag100 − Sag80\| + \|Sag80 − Sag60\|)/CT4 | 0.07 |
| f2/f3 | −0.59 | | |

8th Embodiment

Figure 15:
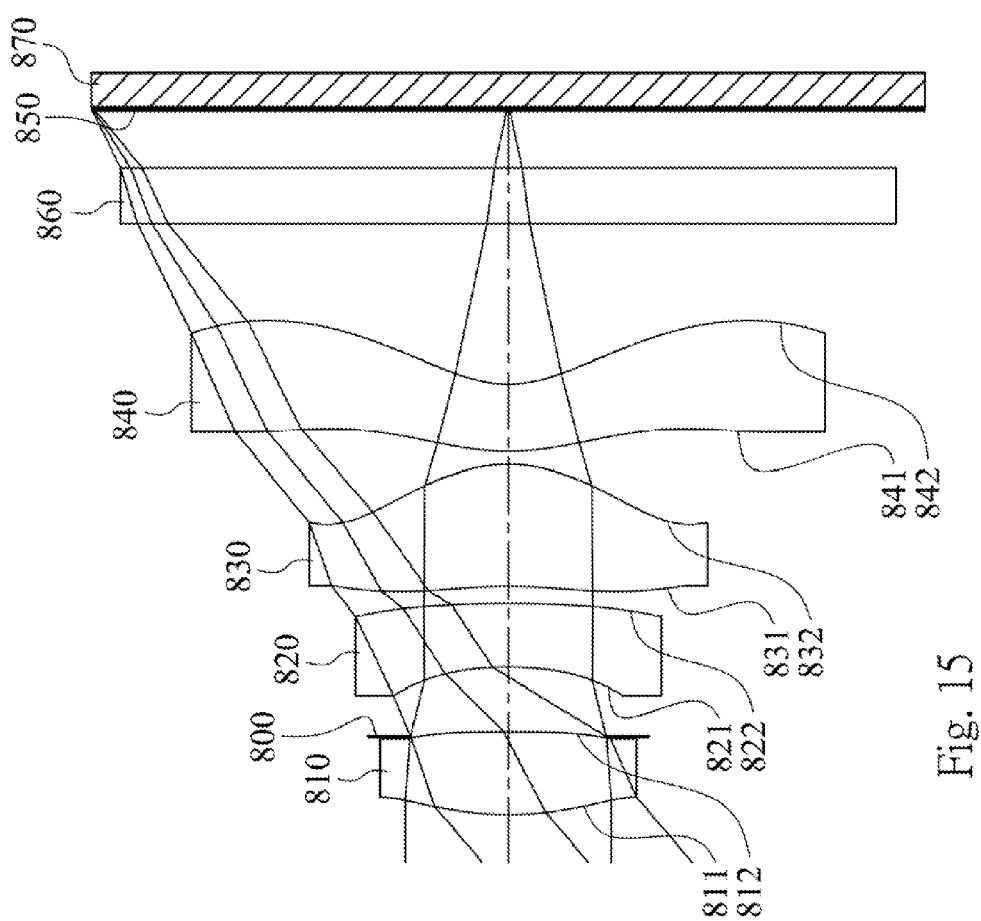
FIG. 15 is a schematic view of an image capturing lens assembly according to the 8th embodiment of the present disclosure.
Figure 16:
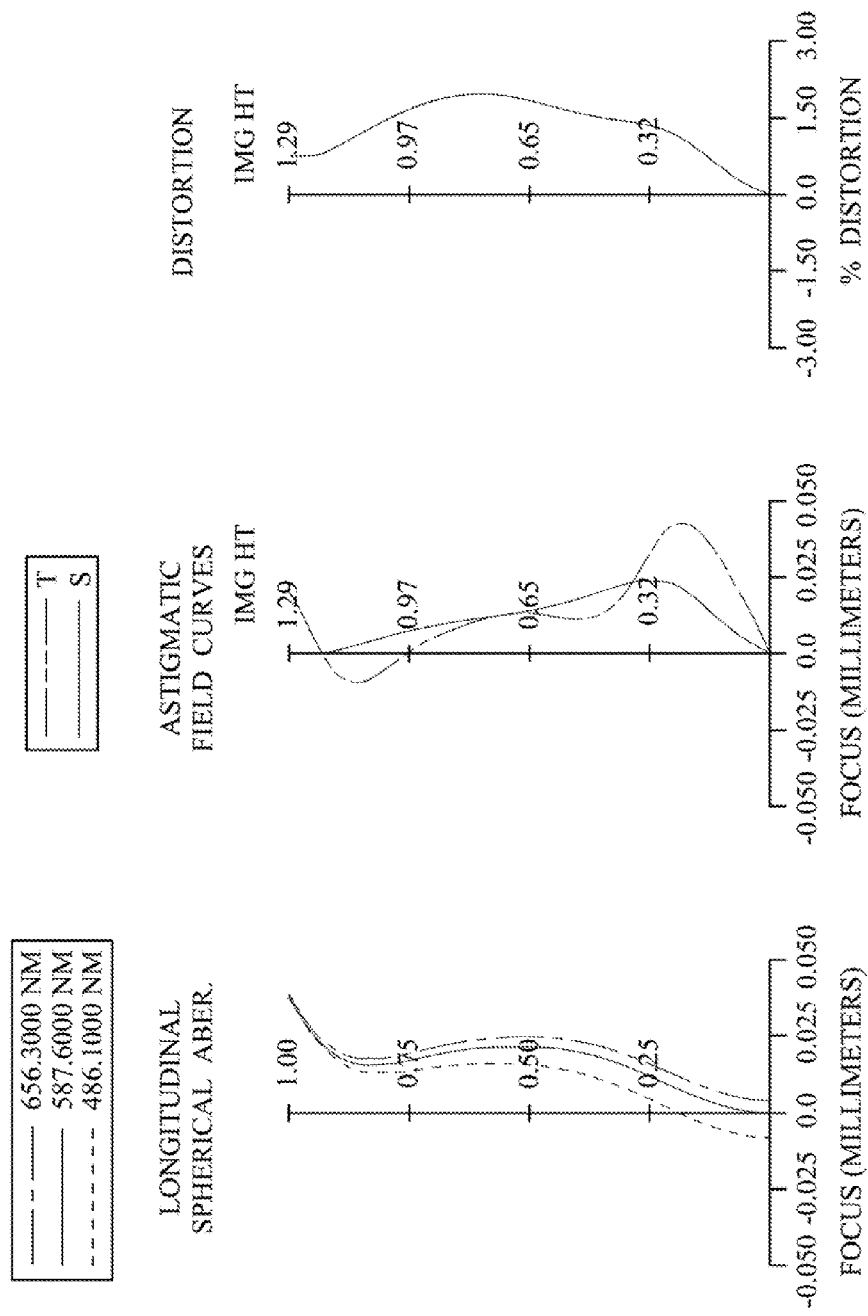
FIG. 16 shows spherical aberration curves, astigmatic field curves and a distortion curve of the image capturing lens assembly according to the 8th embodiment.

FIG. 15 is a schematic view of an image capturing lens assembly according to the 8th embodiment of the present disclosure. FIG. 16 shows spherical aberration curves, astigmatic field curves and a distortion curve of the image capturing lens assembly according to the 8th embodiment. In FIG. 15, the image capturing lens assembly includes, in order from an object side to an image side, a first lens element 810, an aperture stop 800, a second lens element 820, a third lens element 830, a fourth lens element 840, an IR-cut filter 860, an image plane 850 and an image sensor 870, wherein the image capturing lens assembly has a total of four lens elements (810-840) with refractive power.

The first lens element 810 with positive refractive power has a convex object-side surface 811 in a paraxial region thereof and a convex image-side surface 812 in a paraxial region thereof, and is made of plastic material. The object-side surface 811 and the image-side surface 812 of the first lens element 810 are aspheric.

The second lens element 820 with negative refractive power has a concave object-side surface 821 in a paraxial region thereof and a convex image-side surface 822 in a paraxial region thereof, and is made of plastic material. The object-side surface 821 and the image-side surface 822 of the second lens element 820 are aspheric.

The third lens element 830 with positive refractive power has a concave object-side surface 831 in a paraxial region thereof and a convex image-side surface 832 in a paraxial region thereof, and is made of plastic material. The object-side surface 831 and the image-side surface 832 of the third lens element 830 are aspheric.

The fourth lens element 840 with negative refractive power has a convex object-side surface 841 in a paraxial region thereof and a concave image-side surface 842 in a paraxial region thereof, and is made of plastic material. The object-side surface 841 and the image-side surface 842 of the fourth lens element 840 are aspheric. Furthermore, the image-side surface 842 of the fourth lens element 840 has at least one convex shape in an off-axis region thereof.

The IR-cut filter 860 is made of glass and located between the fourth lens element 840 and the image plane 850, and will not affect the focal length of the image capturing lens assembly.

The detailed optical data of the 8th embodiment are shown in Table 15 and the aspheric surface data are shown in Table 16 below.

TABLE 15

8th Embodiment
f = 1.51 mm, Fno = 2.35, HFOV = 40.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.031 | ASP | 0.258 | Plastic | 1.544 | 55.9 | 1.65 |
| 2 | | −6.300 | ASP | −0.014 | | | | |
| 3 | Ape. Stop | Plano | | 0.215 | | | | |
| 4 | Lens 2 | −1.072 | ASP | 0.200 | Plastic | 1.633 | 23.4 | −2.49 |
| 5 | | −3.587 | ASP | 0.053 | | | | |
| 6 | Lens 3 | −1.541 | ASP | 0.381 | Plastic | 1.544 | 55.9 | 0.98 |
| 7 | | −0.432 | ASP | 0.040 | | | | |
| 8 | Lens 4 | 0.777 | ASP | 0.210 | Plastic | 1.535 | 55.7 | −1.44 |
| 9 | | 0.350 | ASP | 0.500 | | | | |
| 10 | IR-cut filter | Plano | | 0.175 | Glass | 1.517 | 64.2 | |
| 11 | | Plano | | 0.184 | | | | |
| 12 | Image | Plano | | — | | | | |

Note:
Reference wavelength is 587.6 nm (d-line).

TABLE 16

Aspheric Coefficients

| Surface # | 1 | 2 | 4 | 5 |
|---|---|---|---|---|
| k= | 2.8929E+00 | −2.7069E+01 | −1.0947E+01 | −8.9977E+01 |
| A4= | −3.9221E−01 | −5.9912E−01 | −3.3267E+00 | −5.2574E−01 |
| A6= | −1.4526E+01 | −3.2788E+01 | 2.8544E+01 | 1.2705E+01 |
| A8= | 2.4728E+02 | 9.7816E+02 | −6.0808E+02 | −1.6620E+02 |
| A10= | −2.9800E+03 | −1.7928E+04 | 6.4802E+03 | 8.5965E+02 |
| A12= | 1.8477E+04 | 1.8115E+05 | −3.2936E+04 | −2.0240E+03 |
| A14= | −6.1904E+04 | −9.5446E+05 | 8.1689E+04 | 2.2393E+03 |
| A16= | 8.4366E+04 | 2.0654E+06 | −7.9096E+04 | −9.4231E+02 |

| Surface # | 6 | 7 | 8 | 9 |
|---|---|---|---|---|
| k= | −1.0000E+00 | −5.4451E+00 | −5.7367E+00 | −4.0193E+00 |
| A4= | 1.9223E+00 | −2.5244E+00 | −1.0643E+00 | −7.4004E−01 |
| A6= | 2.5959E+00 | 1.7396E+01 | 9.7946E−01 | 8.6395E−01 |
| A8= | −7.7974E+01 | −7.6435E+01 | 1.0195E+00 | −5.5405E−01 |
| A10= | 4.1674E+02 | 2.9758E+02 | −2.7740E+00 | −9.1522E−02 |
| A12= | −1.0391E+03 | −6.8425E+02 | 2.4741E+00 | 3.6266E−01 |
| A14= | 1.2278E+03 | 7.6459E+02 | −1.0618E+00 | −1.9242E−01 |
| A16= | −5.4994E+02 | −3.2256E+02 | 1.6900E−01 | 3.2555E−02 |

In the image capturing lens assembly according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following conditions:

| 8th Embodiment | | | |
|---|---|---|---|
| f [mm] | 1.81 | f/f4 | −1.05 |
| Fno | 2.35 | (R1 + R2)/(R1 − R2) | −0.72 |
| HFOV [deg.] | 40.2 | SD41/SD32 | 1.37 |
| T12/(T23 + T34) | 2.16 | FOV [deg.] | 80.4 |
| R2/R3 | 5.87 | TL/Tan (HFOV) [mm] | 2.61 |
| R4/R3 | 3.35 | (|Sag100 − Sag80| + |Sag80 − Sag60|)/CT4 | 0.04 |
| f2/f3 | −2.54 | | |

9th Embodiment

Figure 17:
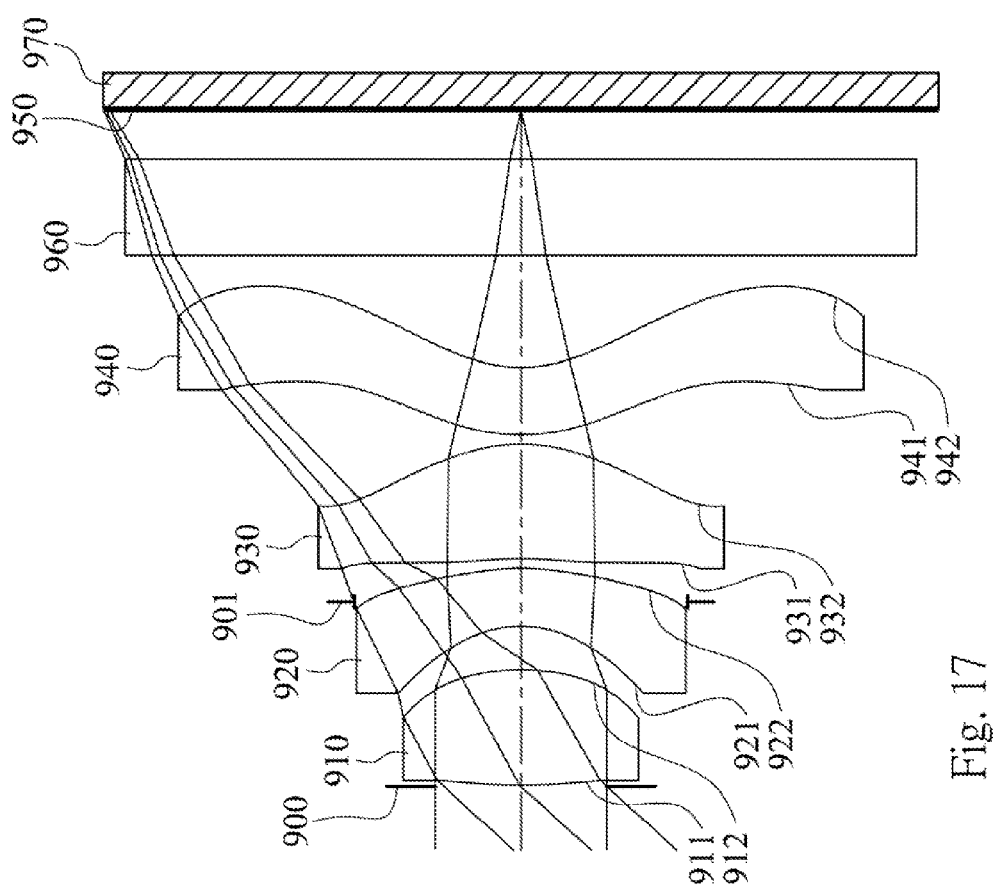
FIG. 17 is a schematic view of an image capturing lens assembly according to the 9th embodiment of the present disclosure.
Figure 18:
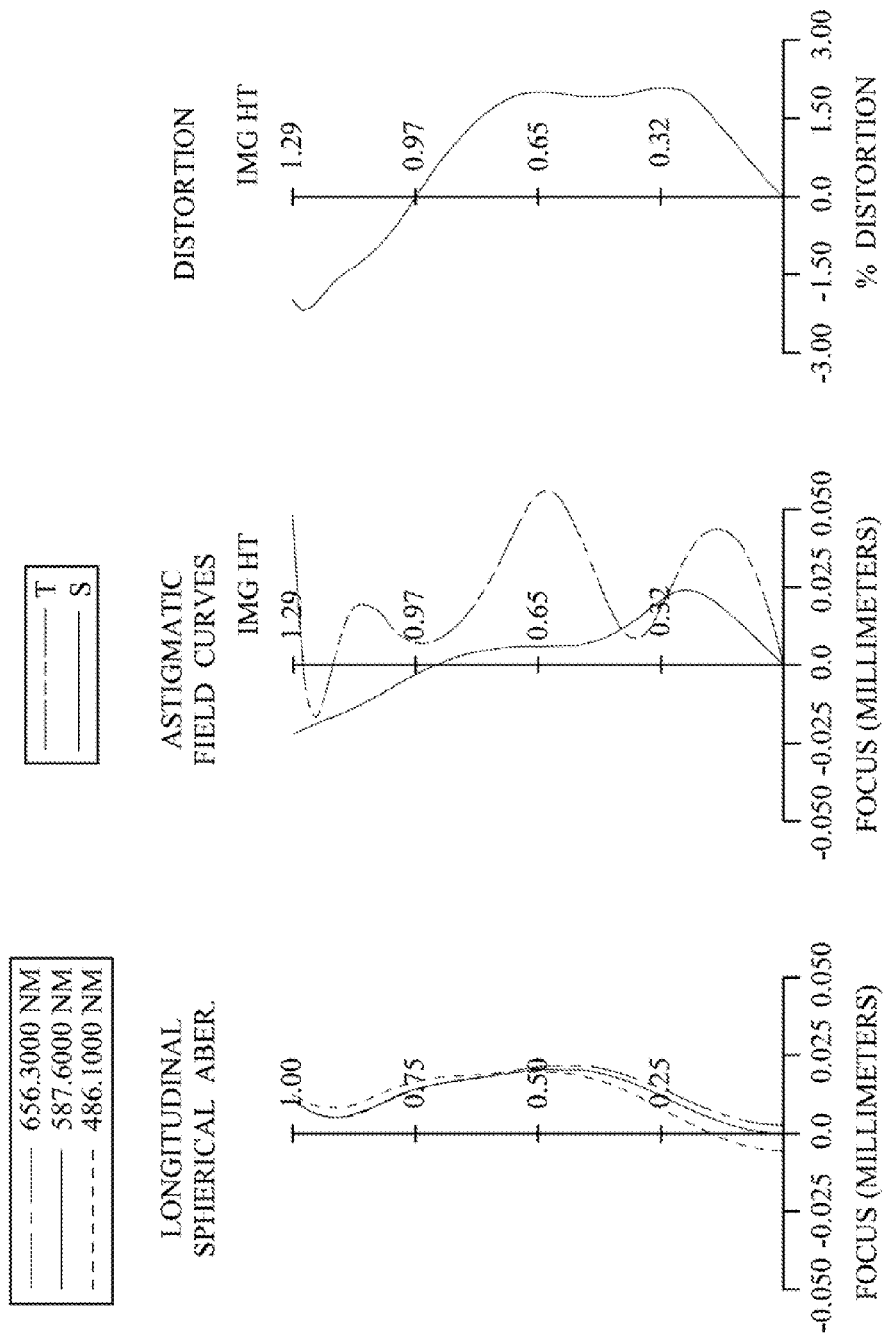
FIG. 18 shows spherical aberration curves, astigmatic field curves and a distortion curve of the image capturing lens assembly according to the 9th embodiment.

FIG. 17 is a schematic view of an image capturing lens assembly according to the 9th embodiment of the present disclosure. FIG. 18 shows spherical aberration curves, astigmatic field curves and a distortion curve of the image capturing lens assembly according to the 9th embodiment. In FIG. 17, the image capturing lens assembly includes, in order from an object side to an image side, an aperture stop 900, a first lens element 910, a second lens element 920, a stop 901, a third lens element 930, a fourth lens element 940, an IR-cut filter 960, an image plane 950 and an image sensor 970, wherein the image capturing lens assembly has a total of four lens elements (910-940) with refractive power.

The first lens element 910 with positive refractive power has a convex object-side surface 911 in a paraxial region thereof and a convex image-side surface 912 in a paraxial region thereof, and is made of plastic material. The object-side surface 911 and the image-side surface 912 of the first lens element 910 are aspheric.

The second lens element 920 with negative refractive power has a concave object-side surface 921 in a paraxial region thereof and a convex image-side surface 922 in a paraxial region thereof, and is made of plastic material. The object-side surface 921 and the image-side surface 922 of the second lens element 920 are aspheric.

The third lens element 930 with positive refractive power has a concave object-side surface 931 in a paraxial region thereof and a convex image-side surface 932 in a paraxial region thereof, and is made of plastic material. The object-side surface 931 and the image-side surface 932 of the third lens element 930 are aspheric.

The fourth lens element 940 with negative refractive power has a convex object-side surface 941 in a paraxial region thereof and a concave image-side surface 942 in a paraxial region thereof, and is made of plastic material. The object-side surface 941 and the image-side surface 942 of the fourth lens element 940 are aspheric. Furthermore, the image-side surface 942 of the fourth lens element 940 has at least one convex shape in an off-axis region thereof.

The IR-cut filter 960 is made of glass and located between the fourth lens element 940 and the image plane 950, and will not affect the focal length of the image capturing lens assembly.

The detailed optical data of the 9th embodiment are shown in Table 17 and the aspheric surface data are shown in Table 18 below.

TABLE 17

9th Embedment
f = 1.20 mm, Fno = 2.25, HFOV = 47.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.004 | | | | |
| 2 | Lens 1 | 1.606 | ASP | 0.358 | Plastic | 1.544 | 55.9 | 0.97 |
| 3 | | −0.725 | ASP | 0.137 | | | | |
| 4 | Lens 2 | −0.357 | ASP | 0.180 | Plastic | 1.634 | 23.8 | −1.83 |
| 5 | | −0.616 | ASP | −0.104 | | | | |
| 6 | Stop | Plano | | 0.134 | | | | |
| 7 | Lens 3 | −0.876 | ASP | 0.357 | Plastic | 1.544 | 55.9 | 1.64 |
| 8 | | −0.506 | ASP | 0.030 | | | | |
| 9 | Lens 4 | 0.615 | ASP | 0.210 | Plastic | 1.535 | 55.7 | −4.60 |
| 10 | | 0.434 | ASP | 0.350 | | | | |
| 11 | IR-cut filter | Plano | | 0.300 | Glass | 1.517 | 64.2 | |
| 12 | | Plano | | 0.156 | | | | |
| 13 | Image | Plano | | — | | | | |

Note:
Reference wavelength is 587.6 nm (d-line).
The effective radius of Surface 6 is 0.520 mm.

TABLE 18

Aspheric Coefficients

| Surface # | 2 | 3 | 4 | 5 |
|---|---|---|---|---|
| k= | 1.2152E+01 | −8.8273E−01 | −7.5616E+00 | −2.2100E+01 |
| A4= | −1.3867E+00 | −1.4258E+00 | −1.4148E+01 | 2.7029E+00 |
| A6= | −1.0073E+01 | −5.6713E+01 | 1.3497E+02 | −6.6878E+01 |
| A8= | 8.6430E+02 | 1.5420E+03 | −7.1227E+02 | 7.0315E+02 |
| A10= | −4.1434E+04 | −2.4876E+04 | 5.6313E+01 | −4.1935E+03 |
| A12= | 8.5751E+05 | 2.2815E+05 | 2.9845E+04 | 1.4667E+04 |
| A14= | −8.4923E+06 | −1.1138E+06 | −2.0899E+05 | −2.9180E+04 |
| A16= | 3.1981E+07 | 2.2011E+06 | 5.0540E+05 | 2.5851E+04 |

| Surface # | 7 | 8 | 9 | 10 |
|---|---|---|---|---|
| k= | 4.4911E−01 | −5.3255E+00 | −4.6601E+00 | −3.6412E+00 |
| A4= | 1.2485E+01 | −1.7883E+00 | 1.4414E+00 | 9.5544E−01 |
| A6= | −1.5601E+02 | 2.0734E+01 | −1.0882E+01 | −7.2427E+00 |
| A8= | 1.2579E+03 | −1.6453E+02 | 2.8570E+01 | 1.9492E+01 |
| A10= | −6.4257E+03 | 7.4046E+02 | −4.1616E+01 | −2.9940E+01 |
| A12= | 2.0289E+04 | −1.6917E+03 | 3.6687E+01 | 2.7095E+01 |
| A14= | −3.6163E+04 | 1.8274E+03 | −1.8787E+01 | −1.3388E+01 |
| A16= | 2.7608E+04 | −6.9867E+02 | 4.3316E+00 | 2.7663E+00 |

In the image capturing lens assembly according to the 9th embodiment, the definitions of these parameters shown in the following table are the same as those stated in the 1st embodiment with corresponding values for the 9th embodiment. Moreover, these parameters can be calculated from Table 17 and Table 18 as the following values and satisfy the following conditions:

| 9th Embodiment | | | |
|---|---|---|---|
| f [mm] | 1.20 | f/f4 | −0.26 |
| Fno | 2.25 | (R1 + R2)/(R1 − R2) | 0.38 |
| HFOV [deg.] | 47.5 | SD41/SD32 | 1.48 |
| T12/(T23 + T34) | 2.28 | FOV [deg.] | 95.0 |
| R2/R3 | 2.03 | TL/Tan (HFOV) [mm] | 1.93 |
| R4/R3 | 1.73 | (|Sag100 − Sag80| + |Sag80 − Sag60|)/CT4 | 0.16 |
| f2/f3 | −1.12 | | |

The foregoing description, for purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing lens assembly comprising, in order from an object side to an image side:
   a first lens element with positive refractive power having a convex object-side surface in a paraxial region thereof and a convex image-side surface in a paraxial region thereof;
   a second lens element with negative refractive power having a concave object-side surface in a paraxial region thereof and a convex image-side surface in a paraxial region thereof;
   a third lens element with positive refractive power having a concave object-side surface in a paraxial region thereof and a convex image-side surface in a paraxial region thereof; and
   a fourth lens element with refractive power having a concave image-side surface in a paraxial region thereof, wherein an object-side surface and the image-side surface of the fourth lens element are aspheric, and the image-side surface of the fourth lens element has at least one convex shape in an off-axis region thereof;
   wherein the image capturing lens assembly has a total of four lens elements with refractive power, a curvature radius of the image-side surface of the first lens element is R2, a curvature radius of the object-side surface of the second lens element is R3, an axial distance between the first lens element and the second lens element is T12, an axial distance between the second lens element and the third lens element is T23, an axial distance between the third lens element and the fourth lens element is T34, and the following conditions are satisfied:
   $1.9 < R2/R3$; and
   $2.1 < T12/(T23+T24) < 3.3$.

2. The image capturing lens assembly of claim 1, wherein the fourth lens element has the object-side surface being convex in a paraxial region thereof.

3. The image capturing lens assembly of claim 2, wherein a focal length of the second lens element is f2, a focal length of the third lens element is f3, and the following condition is satisfied:

f2/f3<−0.72.

4. The image capturing lens assembly of claim 2, wherein a maximal field of view of the image capturing lens assembly is FOV, and the following condition is satisfied:

80 degrees<FOV<105 degrees.

5. The image capturing lens assembly of claim 2, wherein a central thickness of the fourth lens element is CT4, a distance in parallel with an optical axis from an axial vertex on the object-side surface of the fourth lens element to a maximum effective radius position on the object-side surface of the fourth lens element is Sag100, a distance in parallel with the optical axis from the axial vertex on the object-side surface of the fourth lens element to 80% of the maximum effective radius position on the object-side surface of the fourth lens element is Sag80, a distance in parallel with the optical axis from the axial vertex on the object-side surface of the fourth lens element to 60% of the maximum effective radius position on the object-side surface of the fourth lens element is Sag60, and the following condition is satisfied:

(|Sag100−Sag80|+|Sag80−Sag60|)/CT4<0.20.

6. The image capturing lens assembly of claim 2, wherein the curvature radius of the object-side surface of the second lens element is R3, a curvature radius of the image-side surface of the second lens element is R4, and the following condition is satisfied:

1.4<R4/R3<3.0.

7. The image capturing lens assembly of claim 2, wherein a focal length of the image capturing lens assembly is f, a focal length of the fourth lens element is f4, and the following condition is satisfied:

−0.50<f/f4<0.50.

8. The image capturing lens assembly of claim 1, wherein an axial distance between the object-side surface of the first lens element and an image plane is TL, half of a maximal field of view of the image capturing lens assembly is HFOV, and the following condition is satisfied:

1.5 mm<TL/Tan(HFOV)<2.5 mm.

9. The image capturing lens assembly of claim 1, wherein the fourth lens element has negative refractive power.

10. The image capturing lens assembly of claim 9, wherein a vertical distance between a maximum effective radius position on the image-side surface of the third lens element and an optical axis is SD32, a vertical distance between a maximum effective radius position on the object-side surface of the fourth lens element and the optical axis is SD41, and the following condition is satisfied:

1.35<SD41/SD32<1.80.

11. The image capturing lens assembly of claim 9, wherein a focal length to of the image capturing lens assembly is f, a focal length of the fourth lens element is f4, and the following condition is satisfied:

−0.5<f/f4<0.

12. The image capturing lens assembly of claim 11, wherein a curvature radius of the object-side surface of the first lens element is R1, the curvature radius of the image-side surface of the first lens element is R2, and the following condition is satisfied:

−0.6<(R1+R2)/(R1−R2)<0.6.

13. The image capturing lens assembly of claim 11, wherein a focal length of the second lens element is f2, a focal length of the third lens element is f3, and the following condition is satisfied:

−3.0<f2/f3<−1.0.

14. An image capturing device, comprising:
the image capturing lens assembly as set forth herein in claim 1; and
an image sensor disposed on an image plane of the image capturing lens assembly.

15. An image capturing lens assembly comprising, in order from an object side to an image side:
a first lens element with positive refractive power having a convex object-side surface in a paraxial region thereof and a convex image-side surface in a paraxial region thereof;
a second lens element with negative refractive power having a concave object-side surface in a paraxial region thereof and a convex image-side surface in a paraxial region thereof;
a third lens element with positive refractive power having a concave object-side surface in a paraxial region thereof and a convex image-side surface in a paraxial region thereof; and
a fourth lens element with refractive power having a convex object-side surface in a paraxial region thereof and a concave image-side surface in a paraxial region thereof, wherein the object-side surface and the image-side surface of the fourth lens element are aspheric, and the image-side surface of the fourth lens element has at least one convex shape in an off-axis region thereof;
wherein the image capturing lens assembly has a total of four lens elements with refractive power, a curvature radius of the image-side surface of the first lens element is R2, a curvature radius of the object-side surface of the second lens element is R3, an axial distance between the first lens element and the second lens element is T12, an axial distance between the second lens element and the third lens element is T23, an axial distance between the third lens element and the fourth lens element is T34, a focal length of the second lens element is f2, a focal length of the third lens element is f3, and the following conditions are satisfied:

1.8<R2/R3;
1.9<T12/(T23+T34)<3.3; and
f2/f3<−0.80.

16. The image capturing lens assembly of claim 15, wherein an axial distance between the object-side surface of the first lens element and an image plane is TL, half of a maximal field of view of the image capturing lens assembly is HFOV, and the following condition is satisfied:

1.5 mm<TL/Tan(HFOV)<2.5 mm.

17. The image capturing lens assembly of claim 15, wherein a focal length of the image capturing lens assembly is f, a focal length of the fourth lens element is f4, and the following condition is satisfied:

−0.5<f/f4<0.

18. The image capturing lens assembly of claim 15, wherein a vertical distance between a maximum effective radius position on the image-side surface of the third lens element and an optical axis is SD32, a vertical distance between a maximum effective radius position on the object-side surface of the fourth lens element and the optical axis is SD41, and the following condition is satisfied:

1.35<SD41/SD32<1.80.

19. The image capturing lens assembly of claim 15, wherein the curvature radius of the object-side surface of the second lens element is R3, a curvature radius of the image-side surface of the second lens element is R4, and the following condition is satisfied:

$1.4 < R4/R3 < 3.0$.

20. The image capturing lens assembly of claim 15, wherein a maximal field of view of the image capturing lens assembly is FOV, and the following condition is satisfied:

80 degrees < FOV < 105 degrees.

21. The image capturing lens assembly of claim 15, wherein a central thickness of the fourth lens element is CT4, a distance in parallel with an optical axis from an axial vertex on the object-side surface of the fourth lens element to a maximum effective radius position on the object-side surface of the fourth lens element is Sag100, a distance in parallel with the optical axis from the axial vertex on the object-side surface of the fourth lens element to 80% of the maximum effective radius position on the object-side surface of the fourth lens element is Sag80, a distance in parallel with the optical axis from the axial vertex on the object-side surface of the fourth lens element to 60% of the maximum effective radius position on the object-side surface of the fourth lens element is Sag60, and the following condition is satisfied:

$(|Sag100 - Sag80| + |Sag80 - Sag60|)/CT4 < 0.20$.

\* \* \* \* \*